United States Patent [19]
Cohen et al.

[11] Patent Number: 5,353,391
[45] Date of Patent: Oct. 4, 1994

[54] METHOD APPARATUS FOR TRANSITIONING BETWEEN SEQUENCES OF IMAGES

[75] Inventors: Jonathan R. Cohen, San Francisco; Michael Mills, Cupertino, both of Calif.

[73] Assignee: Apple Computer, Inc., Cupertino, Calif.

[21] Appl. No.: 696,353

[22] Filed: May 6, 1991

[51] Int. Cl.$^5$ ............................................. G06F 15/62
[52] U.S. Cl. .................................... 395/125; 395/161
[58] Field of Search ............... 395/152, 148, 150, 151, 395/133, 135, 155, 161; 360/14.1, 14.2, 14.3; 340/747, 750; 364/200 MS File, 900 MS File; 345/121, 122

[56] References Cited

U.S. PATENT DOCUMENTS

| | | | |
|---|---|---|---|
| 4,538,188 | 9/1987 | Barker et al. | 360/14.3 |
| 4,715,008 | 12/1987 | Jones | 364/563 |
| 4,752,836 | 6/1988 | Blanton et al. | 358/342 |
| 4,789,962 | 12/1988 | Berry et al. | 364/900 |
| 4,890,249 | 12/1989 | Yen | 364/578 |
| 4,922,238 | 5/1990 | Aoki et al. | 340/726 |
| 4,933,881 | 6/1990 | Schmidt | 364/525 |
| 4,954,966 | 9/1990 | Mooney et al. | 364/518 |
| 4,970,666 | 11/1990 | Welsh et al. | 364/522 |
| 5,003,491 | 3/1991 | Heckt | 364/518 |
| 5,237,648 | 8/1993 | Mills et al. | 395/133 |
| 5,247,610 | 9/1993 | Oshima et al. | 395/135 |

FOREIGN PATENT DOCUMENTS

039041A3  10/1990  European Pat. Off. ....... H04B 1/20

OTHER PUBLICATIONS

"The Alternate Reality Kit–An Animated Environment for Creating Interactive Simulations", Randall B. Smith, IEEE Proceedings of Workshop on Visual Languages Dallas, Tex., Jun. 25–27, 1986, pp. 99–106.
"Autodesk Animator Refernece Manual", Autodesk, Inc., Publication No. TAN889R.1, Aug. 25, 1989, pp. 7, 265–266.

Primary Examiner—Phu K. Nguyen
Attorney, Agent, or Firm—Blakely, Sokoloff, Taylor & Zafman

[57] ABSTRACT

A method and apparatus for generating and viewing a transition between a first and second sequence of images on a computer controlled display system. The method of the invention involves several steps, including: providing a first and second sequence of digitized images, which are typically stored in the computer system; providing the duration of total time of the transition between the first and second sequence of images; providing a resource means for specifying the transition between the first and second sequence; determining a first portion of the first sequence of images (the first portion having a duration in time less than or equal to the duration of the transition); determining a second portion of the second sequence (the second portion of the second sequence of images having a duration in time less than or equal to the duration of the transition); creating a transition template from the transition resource, the transition template having a duration equal to the transition; and combining the first portion of the first sequence and the second portion of the second sequence with the transition template to thereby produce a third sequence of images. The step of creating a transition template from the transition resource is further comprised of the steps of selecting objects, interpolating objects and/or a source image area and mapping objects to a source image area. In the combining step, the transition template is used to determine which portions of the first source sequence, the second source sequence, or both will be displayed in the third sequence of images. Also provided is a means for modifying a duration of the entire transition or for modifying a duration of individual frames within the transition.

21 Claims, 15 Drawing Sheets

METHOD APPARATUS FOR TRANSITIONING BETWEEN SEQUENCES OF IMAGES

BACKGROUND OF THE INVENTION

1. Field of the Invention

The present invention relates to the field of editing data of sequences of images, e.g. video, in particular, the transition between a first source sequence of images to a second source sequence of images.

2. Description of the Related Art

It is well known in the art that a static image, e.g. a photograph, can be converted into a digital representation of the static image. Similarly, it is well known in the art to convert dynamic images, i.e., video images, into a digital representation. Typically, in the digital representation on, for example, a computer system, the video image is captured as a sequence of static images. Each static image captures an instant in time of the video image. Movement is apparent to the viewer by the rapid display of the sequence of static images.

It is often the case where a first collection of video images is contiguously merged with or transitioned into, a second collection of video images. The mechanics of such a merging or transitioning of video images is described in more detail below in conjunction with specifically designed devices which perform this function. Common techniques known in the art that are used for creating a transition from one video image to a second video image are called "switches". Such "switches" include cuts, wipes, irises, fades and pushes. It should be noted that switching is used in the context of live television broadcasts; where, for example, during a newscast, when a switch is made from a newsperson reporting the weather to a newsperson reporting sports.

As described above, a video image in its digital representation is typically a sequence of static images. It is these sequences of static images which are combined to create a transition. A cut switch is illustrated in FIG. 1a. A first sequence of images is represented by 101 and a second sequence of images is represented by 102. A cut switch results in the sequence of images represented by 103. The sequence of images 103 is what a viewer of the images would see. Here, the sequence of images represented by 101 are sequentially contiguous with the sequence of images represented by 102. In a cut switch there is no overlapping of the two sequences of images. The transition effect is to abruptly change from a scene in the first sequence of images to a scene in the second sequence of images.

A wipe switch is illustrated in FIG. 1b. Here, the second sequence of images 102 overlays the first sequence of images 101, creating an overlay sequence of images represented by 105. The amount of overlap will increase over time, creating a gradual transition effect from the first sequence of images 101 to the second sequence of images 102. The transition effect is to wipe the images of the first sequence with the images of the second sequence. It is known in the art that the wipe switch may come from any direction, e.g. left to fight, right to left, top to bottom or bottom to top.

An iris switch is illustrated in FIG. 1c. Here the first sequence of images 101 is seemingly taken over by the second sequence of images 102. The iris is used in the optical sense, as an opening up to obtain more light. In the sequence of images represented by 102 the second sequence of images 102 is displayed in the middle of the first sequence of images 101, illustrated as 108. Over time, the portion displaying the second sequence of images 102 expands until only the second sequence of images is displayed. The transition effect is the opening of an iris to display the second sequence of images. The initial opening of the iris switch may originate from any point on the display of the images.

A push switch is illustrated in FIG. 1d. Here the first sequence of images 101 is pushed out of view by the second sequence of images 102. In this example, the right most portion of the second sequence of images 102 appears to be pushing the left most portion of the first sequence of images 101, as illustrated in the sequence represented by 109. This occurs over time until the second sequence of images 102 is fully displayed. The transition effect is of the second sequence of images physically pushing the first sequence of images out of view (or off the screen). However, the push direction may alternatively be fight to left, top to bottom or bottom to top.

A fade switch is illustrated in FIG. 1e. Here, the first sequence of images 101 gradually fades to a predetermined color, e.g. black. As illustrated in the sequence represented by 110, a first static image 111 which is gray, is followed by an image 112 which is black. The sequence of images 110 will then continue with a gray image 113 until the second sequence of images 102 is displayed. The transition effect is to fade the first sequence of images to a predetermined color and then to immediately fade from the predetermined color to the second sequence of images.

A dissolve switch (not illustrated) is conceptually identical to a fade switch, except that the first sequence of images transitions directly into the second sequence of images rather than to an intermediate predetermined color.

Means for creating a transition effect or switch are known in the art. Such means include individually creating the static images for the switch from which the first and second image sequences are combined, and interpolation. Interpolation refers to creating a begin and end state for a transition and utilizing a processing means to determine the transition states in between. Known tools for creating a switch or transition effect that exist in the art are limited in that they perform only a specific effect or a set of pre-defined effects. Since the sequence of images is in a digital representation it would be useful to use a general purpose computer system to manipulate the data to create a transition between the sequence of images.

A step in this direction is found in a commercially available product known as the Video Toaster, manufactured and sold by NewTek, Inc. of Topeka Kansas. The Video Toaster includes specifically designed video graphics chips and is designed to be used with a computer system known as the AMIGA System, available from Commodore Business Machines, Inc., of Westchester, Pa. The Video Toaster provides predefined switches, fading and other video editing capabilities. Additionally, the Video Toaster requires the use of at least two display devices. A first display device provides for a user interface to the video editing tools, while a second display device displays the program image.

The Video Toaster provides a user interface that is typical for switching devices. A user interface is the means by which a user interacts with a computer system or other device. Such a typical user interface for switching devices is as illustrated in FIG. 2. A first row of identifiers 201 provides for selection of a first input source, typically called a program source, a second row of identifiers 202 provides for selection of a second input source typically called a preview source, a manual T-Bar switcher 203 provides for switching from a program source to a preview source and a take button 204, provides for initiating a pre-defined switch. The identifiers in row 201 and 202 are typically push buttons which illuminate when that source is selected. In FIG. 2, the button 205 representing program source 2 and the button 206 representing the preview source 4 are illuminated and thus selected. The buttons which are selected determine the sequence of images which will include a switch.

The video source represented by each of the identifiers are from independent video sources, e.g. a camera or VCR. Additionally, there may be a dedicated monitor for displaying the program source. The source itself would generally be viewable via a display such as a television or monitor. So in reference to FIG. 2 a source may be either a program or preview source. During a switch, the program source will transition to the preview source. A user may verify the switch in two ways. First, the monitor displaying the program source would now be displaying the new program (previously the preview) source. Additionally, the identifier representing the new program source would be illuminated (and the previous program source would not). In the interface the identifier representing the program source and the preview source, will be illuminated.

A cut switch as described above may be performed by depressing a button in the program row of the desired program source. A fade switch will occur by using the T-Bar switcher 203. This may typically happen by pulling the handle of the T-Bar switcher downward. In this way, the speed of the fade may be controlled. In some switch devices the switch itself defines the manner in which the switch will occur. With the aforementioned Video Toaster, the switch type may be chosen from a plurality of icons presented to the user. The user would typically position the cursor over the desired icon with a cursor control device, such as a mouse or track-ball, and click on the icon. Clicking refers to rapidly depressing and releasing a button (i.e. an electrical switch) associated with the cursor control device. By depressing the take or auto button, the switch would take place according to the selected switch effect.

The video switch interface described above is known to those skilled in the art of video switching. However, it is believed that this video switching interface is not well known to the average computer system user. As the use of video in computer systems is increasingly being used to convey information, a higher number of people will be required to perform video editing like functions. It would be desirable to provide a user interface to such a video switching system that is consistent with known user interfaces, e.g. the Macintosh ® interface, of the Macintosh family of computers (available from Apple Computer, Inc. of Cupertino, Calif.).

Further, a user of the Video Toaster and other known switching devices selects a transition effect by choosing a static icon representing the effect. It would be beneficial to provide a system where a transition effect can be chosen by a user in a What You See Is What You Get (WYSIWYG) fashion. WYSIWYG is a term that refers to a user interface. A WYSIWYG user interface allows for a user to visually see the effect of a performed operation. This allows the user to make more informed choices about alternative video effects. Although a static icon is useful when representing application software or a data file, it does not provide the user with the dynamic visualization needed to truly determine what the effect will be. WYSIWYG in this context also refers to the capability to view both the first source sequence of images and the second source sequence of images on the same display.

It is also significant that in the known prior art, no means are provided for a user to create a switch. The user is limited to the types of switches that are provided where each switch displays predetermined sequences of images which are displayed by selecting a particular button, such as button 205 or 206. As described above, the use of video in computer systems is emerging as a means of providing information. Thus, it is beneficial to the creator of that information to have the means to customize a switch to meet their particular needs.

It is an object of the present invention to provide a system where transition effects are presented in a WYSIWYG fashion and that provides a means for user definition and tailoring of a transition effect.

SUMMARY OF THE INVENTION

The present invention is practiced in a computer controlled display system and involves a method and apparatus for transitioning between two sequences of digitized images which are typically stored in the computer system. The method describes a process for user definition and manipulation of a transition resource. The transition resource specifies the transition between the two sequences of images. The visual aspect of the transition is determined by temporal and spatial information provided by the transition resource.

In general, the method of the invention involves several steps, including: providing a first and second sequence of digitized images, which are typically stored in the computer system; providing the duration of total time of the transition between the first and second sequence of images; providing a resource means for specifying the transition between the first and second sequence; determining a first portion of the first sequence of images (the first portion having a duration in time less than or equal to the duration of the transition); determining a second portion of the second sequence (the second portion of the second sequence of images having a duration in time less than or equal to the duration of the transition); creating a transition template from the transition resource, said transition template having a duration equal to the transition; and combining the first portion of the first sequence and the second portion of the second sequence with the transition template to thereby produce a third sequence of images.

The step of creating a transition template from the transition resource is further comprised of the steps of selecting objects, interpolating objects and/or a source image area and mapping objects to a source image area. In the combining step, the transition template is used to determine which portions of the first source sequence, the second source sequence, or both will be displayed in the third sequence of images.

The present invention uses dicons, to convey transition information to a user in a visual fashion. The present invention further provides a means for modifying a duration of the entire transition or for modifying a duration of individual frames within the transition.

DETAILED DESCRIPTION OF THE PREFERRED EMBODIMENT

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

A method and apparatus for transitioning between two sequences of images stored in a computer system is described. In the following description, numerous specific details are set forth such as data structures and software code sections, in order to provide a thorough understanding of the present invention. It will be apparent, however, to one skilled in the art that the present invention may be practiced without these specific details. In other instances, well-known control logic and coding techniques have not been shown in detail in order not to unnecessarily obscure the present invention.

Overview of the Computer System of the Preferred Embodiment

Figure 1A:
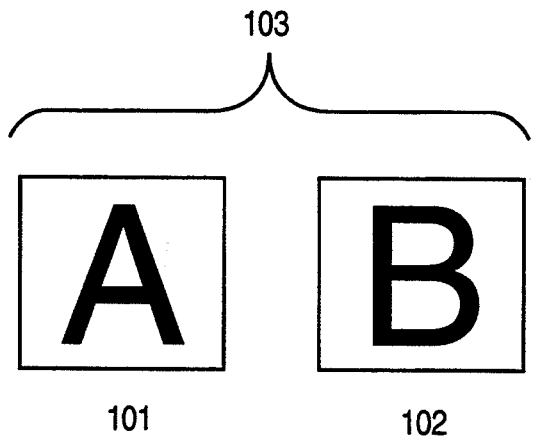
FIG. 1a illustrates prior art cut transition from a first sequence of images to a second sequence of images.
Figure 1B:
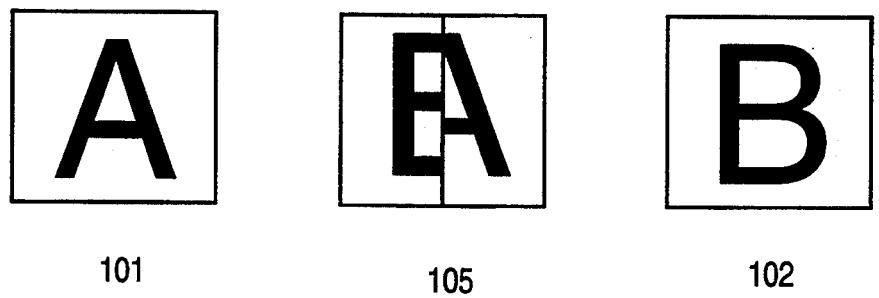
FIG. 1b illustrates prior art wipe transition from a first sequence of images to a second sequence of images.
Figure 1C:
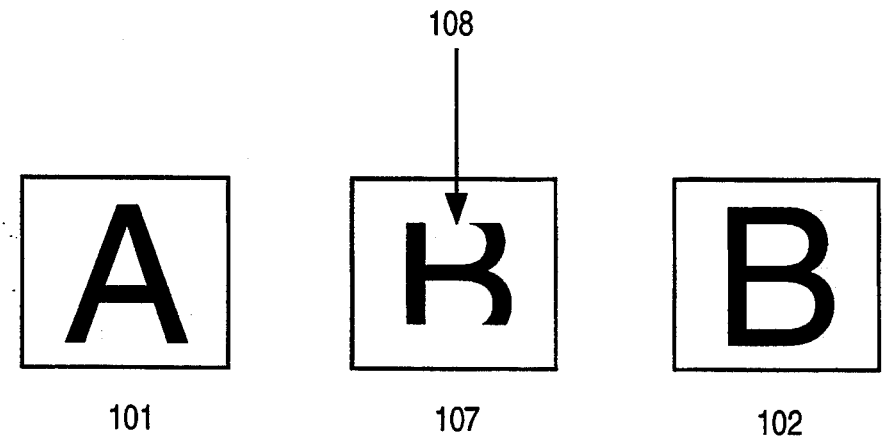
FIG. 1c illustrates prior art iris transition from a first sequence of images to a second sequence of images.
Figure 1D:
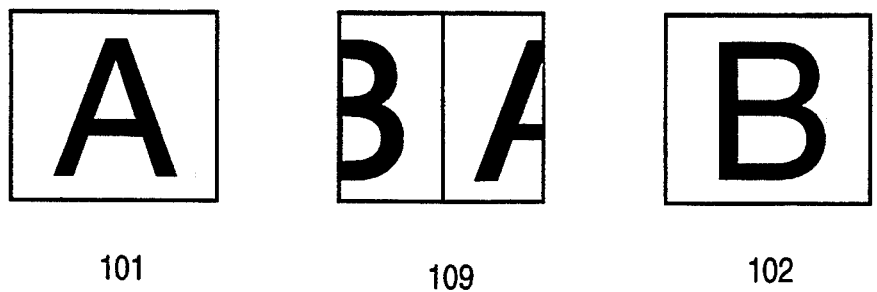
FIG. 1d illustrates prior art push transition from a first sequence of images to a second sequence of images.
Figure 1E:
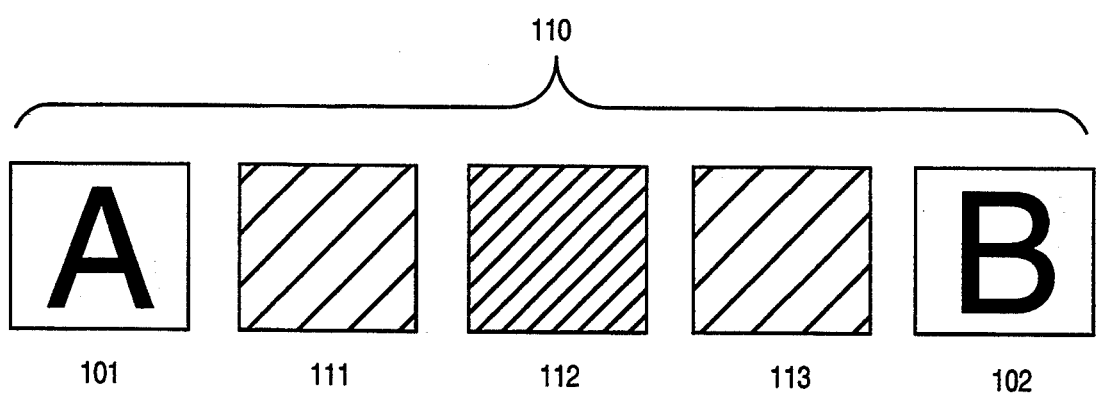
FIG. 1e illustrates prior art fade transition from a first sequence of images to a second sequence of images.
Figure 2:
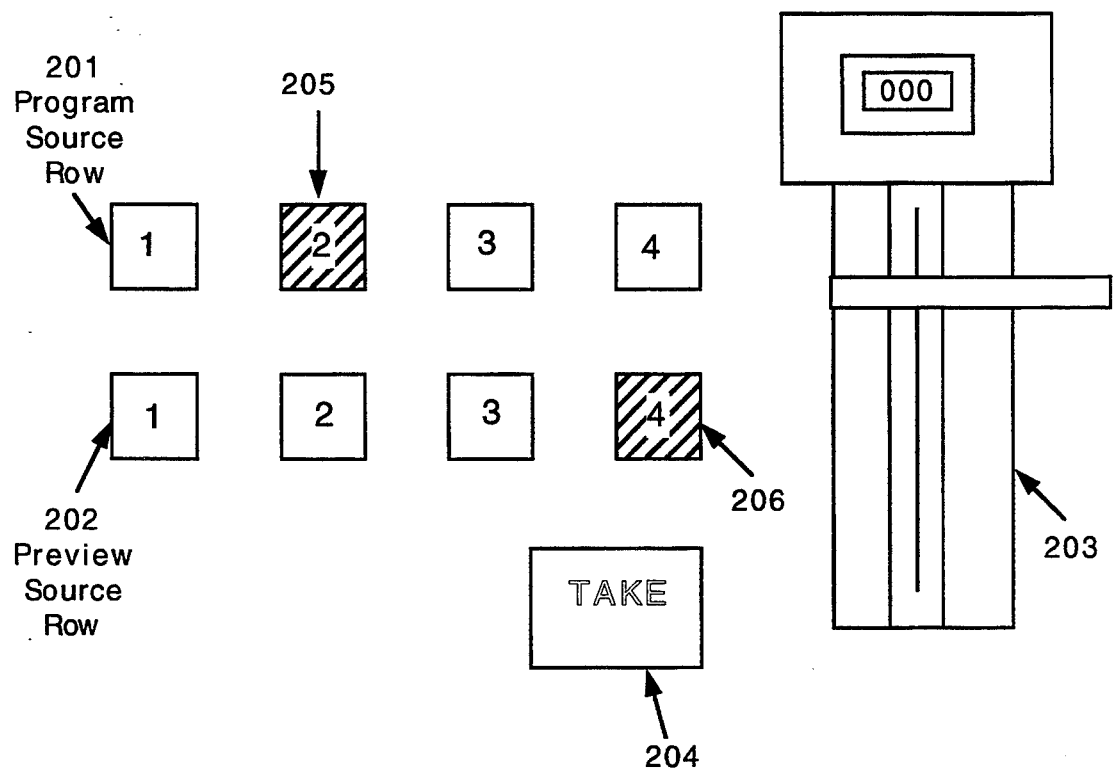
FIG. 2 illustrates a prior art user interface for a switching device.
Figure 3:
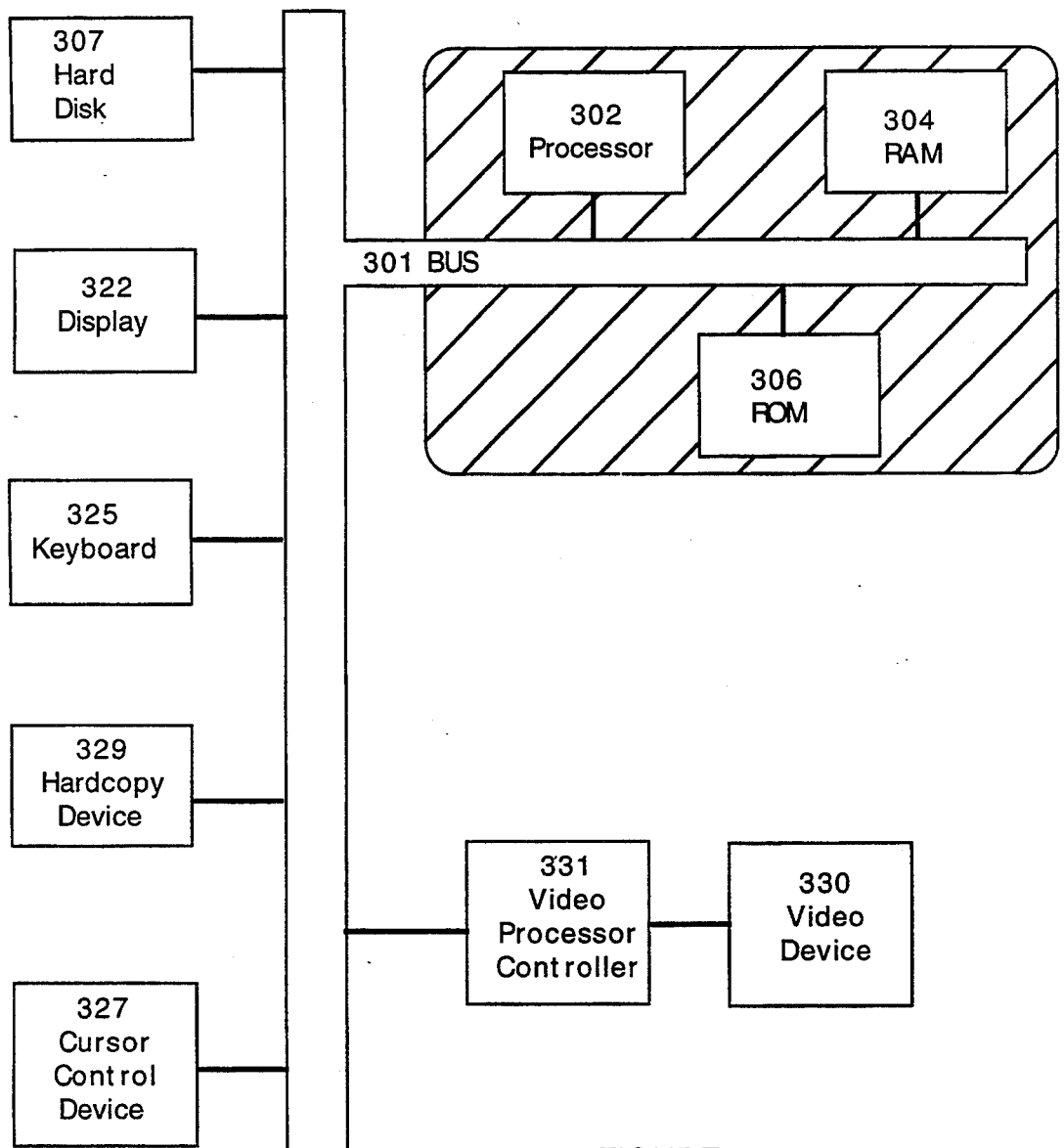
FIG. 3 illustrates a computer system as may be utilized by the preferred embodiment of the present invention.

The computer system of the preferred embodiment is described with reference to FIG. 3. The present invention may be implemented on a general purpose microcomputer, such as one of the members of the Apple ® Macintosh ® family, one of the members of the IBM Personal Computer family, or one of several work-station or graphics computer devices which are presently commercially available. Of course, the present invention may also be implemented on a multi-user system while encountering all of the cost, speed and function advantages and disadvantages available with these machines. In any event, a computer system as may be utilized by the preferred embodiment generally comprises a bus or other communication means 301 for communicating information, a processing means 302 coupled with said bus 301 for processing information, a random access memory (RAM) or other storage device 304 (commonly referred to as a main memory) coupled with said bus 301 for storing information and instructions for said processor 302, a read only memory (ROM) or other static storage device 306 coupled with said bus 301 for storing static information and instructions for said processor 302, a data storage device 307, such as a magnetic disk and disk drive, coupled with said bus 301 for storing information and instructions, a display device 322, such as a cathode ray tube, liquid crystal display, etc, coupled to said bus 301 for displaying information to the computer user, an alphanumeric input device 325 including alphanumeric and other keys coupled to said bus 301 for communicating information and command selections to said processor 302, a cursor control device 327, such as a mouse, track-ball, cursor control keys, etc, coupled to said bus 301 for communicating information and command selections to said processor 302 and for controlling cursor movement, and a video device 330, such as a VCR or Optical Disk player, said video device 330 coupled to a video processor/controller 331, where said video processor controller 331 is coupled to said bus 301. The video processor controller 331 performs analog to digital conversions. Such video processor controllers 331 are known in the art and perform the analog to digital conversion into a multiplicity of formats (including NTSC or PAL). Such video processor controllers 331 are commercially available from vendors such as Raster Ops of Santa Clara, California. Further, it is known in the art to output digital video signals directly from a digital video device. If such a device was utilized, a video processor controller may not be needed. Finally, it is useful if the system includes a hardcopy device 329, such as a printer, for providing permanent copies of information. The hardcopy device 329 is coupled with the processor 302, main memory 304, static memory 306 and mass storage device 307 through bus 301.

The preferred embodiment of the present invention is implemented for use on a Macintosh computer available from Apple Computer, Inc. of Cupertino, Calif.

In the preferred embodiment the first and second sequence of images that are being processed are stored on a storage device coupled to the computer system. The sequences of images may be stored in any of a plurality of digital video formats, e.g. the NTSC or PAL digital video formats. The format that the sequence of images is stored in is typically the same format in which it was created (there may be cases where the sequence of images has been reformatted prior to it utilization in the present invention). The preferred embodiment provides means for processing video data that is independent from the digital format that it is stored in.

Using the NTSC format as an example, 30 (thirty) flames are required for each second of video. A frame corresponds to an individual image in a sequence of images. A display screen is comprised of a plurality of picture elements (commonly referred to as pixels). A digital representation of a frame is a collection of data storage elements that are used to define the state of the pixels that make-up the image, as well as information concerning the duration a frame will be displayed. It should be further noted that typically, a sequence of images will also provide information concerning the video format that it is in. This is done so that a means for displaying the images may do so in a proper fashion (e.g. the computer system of the preferred embodiment displaying the proper number of frames per second).

User Interface

A user interface is the means by which a user interacts with a computer system. Known user interfaces utilize windows and icons in conjunction with a cursor control device. The cursor control device, commonly a mouse or trackball device, is used to position a cursor on a display. The mouse or trackball typically includes an electrical switch having at least two positions for generating signals to the computer to indicate a selection or other action by a user. The, electrical switch is typically accessed via a button on the cursor control device. In order to avoid confusion with the use of the term "switch" as used elsewhere in this description in a transition context, the term button hereinafter will be used to denote the electrical switch. In any event, the combination of the windows, icons, and a cursor control device allows a user to operate in a visual "point and click" fashion rather then through the typing of terse computer commands. "Point and click" operation refers to positioning a cursor on a display so it is over a desired icon (the "point"), setting the button on the cursor control device into a second position (usually by depressing the button) and immediately resetting the button in a first position (usually by releasing the button). The "click" generally refers to tactile and audible feedback to the user on depressing and releasing the button.

An operation to invoke an application or gain access to a file directory is the "double click". The "double click" is similar to the "point and click" except that the button on the cursor control device is "clicked" twice in rapid succession.

Windowing systems provide the capability of displaying data in user-definable regions, which are usually rectangular portions of a display screen. Controls are typically provided to re-size and move windows within the confines of the physical display boundaries. Additional controls provide for scrolling data and/or a document through a data display area associated with the window. It is a feature of window systems to provide for multiple viewable windows within the confines of the physical display boundaries. The window system of the preferred embodiment further provides a feature whereby selected items from a first window may be moved to a second window.

Another aspect of the user interface of the preferred embodiment provides for pull-down menus. Such a pull-down menu is as described in U.S. Pat. No. Re. 32,632, entitled "Display System", Atkinson, assigned to the assignee of the present invention. In such a pull down menu system, the cursor is positioned in a predetermined menu area, where the predetermined area denotes a plurality of submenus. While the cursor is positioned in the predetermined area over the name of the desired submenu, a button associated with the cursor control device may be placed in a second (down) position causing the desired submenu to be displayed. The user may than position the cursor to the desired command within the submenu, wherein the command is invoked when the user places the switch associated with the cursor control device into the first (up) position.

The preferred embodiment makes extensive use of a cursor control device, icons, windows and pull down menus to enable an environment that is intuitively familiar to users of a Macintosh computer system.

Representations of Sequences of Images

The representation of a sequence of images as utilized by the present invention is described in co-pending application, Ser. No. 536,913, filed Jun. 8, 1990, entitled "Sequential Information Controller" assigned to the assignee of the present invention. As described in the co-pending application, the representation of the sequence of images is a "clip frame sequence", which is a collection of frames between a first selected frame and a second selected frame. This "clip frame sequence" may be a portion of a larger sequence of images. In any event, in the "clip frame sequence" the individual frames comprising the "clip frame sequence" are rapidly displayed at the NTSC rate of 30 frames per second, so that the first frame will follow the last frame creating a looping effect and thus causing the representation of the sequence of images to appear as a video output of the sequence of images. Further, the "clip frame sequence" may be selected and dragged across a display screen. A "clip frame sequence" has also been called a dynamic icon (dicon).

A "clip frame sequence" or dicon is also utilized when describing the transition. Briefly, utilizing a still frame displaying the number 1 (called a standard first image) to represent the first source image sequence and a still frame displaying the number 2 (called a standard second image) representing the second source image sequence, the two frames are transitioned to create a sequence of images, i.e. a "clip frame sequence". This is beneficial in that it allows a user to precisely determine the effect that a particular transition effect will have. Although still frames with the numbers 1 and 2 are utilized as the standard first image and the standard second image respectively, in the preferred embodiment, any two still frames, or any two sequence of images, which would convey the meaning of a transition from a first sequence of images to a second sequence of images, may be utilized without departing from the spirit and scope of the present invention. However, the use of still frames is preferred since it minimizes storage requirements (i.e. less space is required for storing a single frame as opposed to an entire sequence of images) for transition dicons.

General User Flow For a Transition

Figure 4:
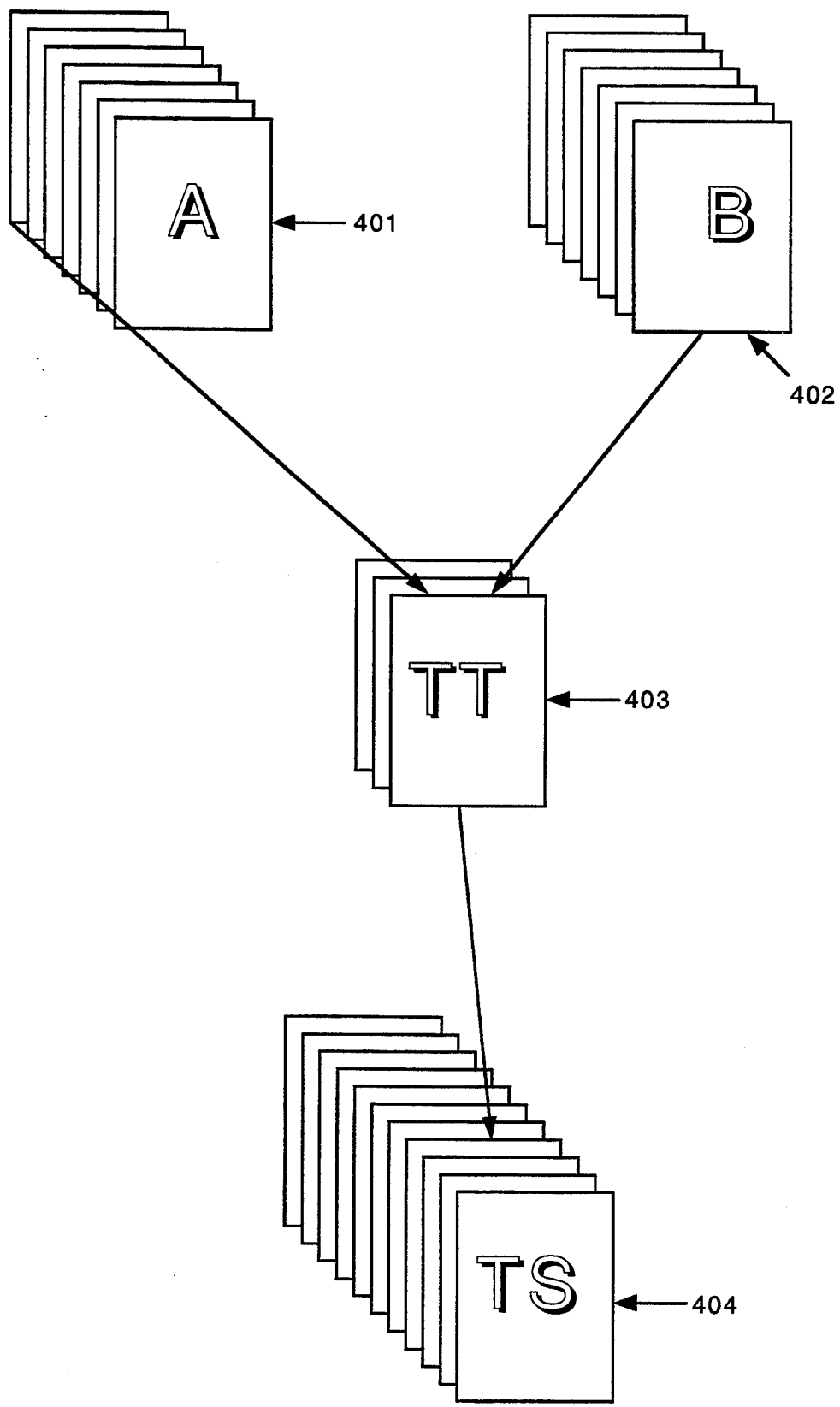
FIG. 4 illustrates the basic flow of a transition in the preferred embodiment of the present invention.

A basic flow for creating a transition in the preferred embodiment is depicted in FIG. 4. A first sequence of images 401 and a second sequence of images 402 are selected as the sources for the transition. A transition resource takes temporal and spatial information from a transition resource data element (i.e. a template definition) and processes them to create a transition template 403. A transition template is a third sequence of images. The transition resources then uses the transition template to create the desired transition sequence 404. The desired transition is a fourth sequence of images depicting the switching from the first sequence of images to the second sequence of images.

Figure 5:
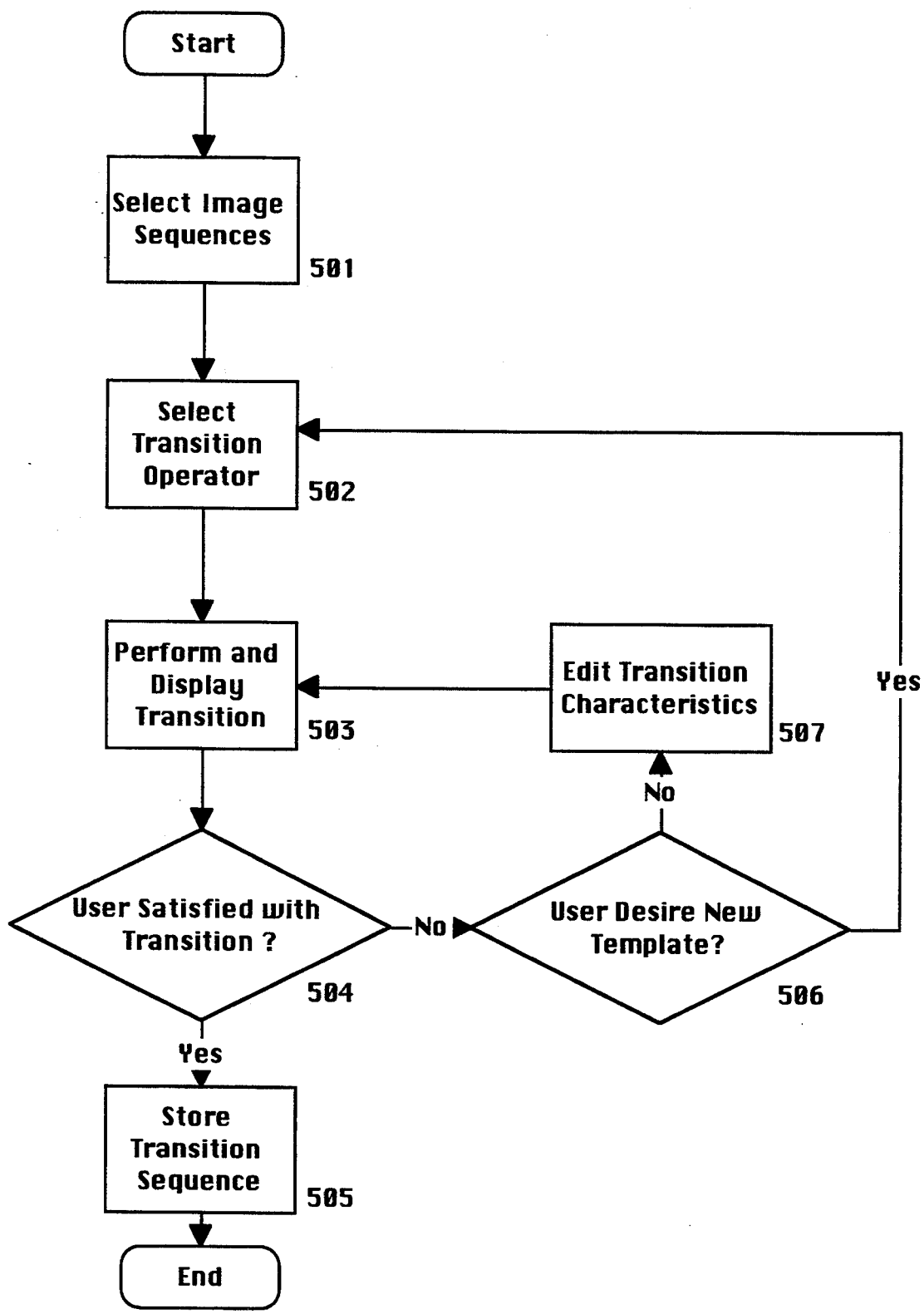
FIG. 5 is a flowchart providing the sequence of operations for performing a transition in the preferred embodiment of the present invention.
Figure 6:
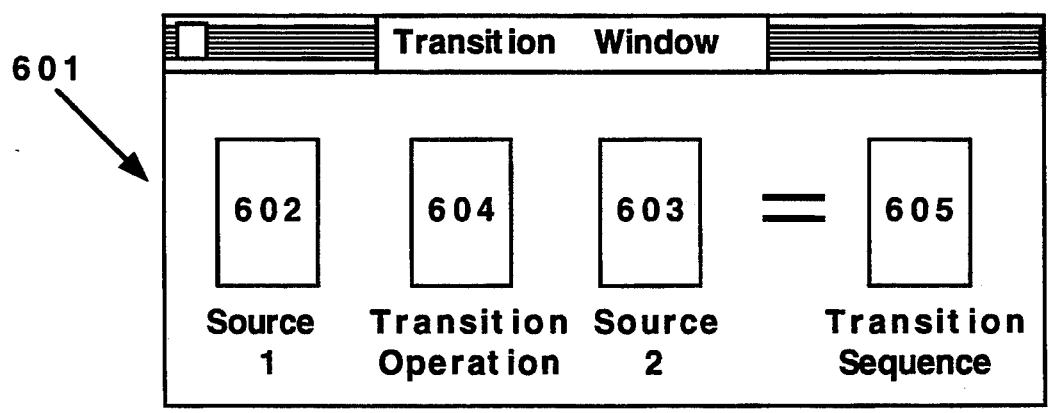
FIG. 6 illustrates a transition window for performing a transition in the preferred embodiment of the present invention.

The steps a user may take to utilize the present invention are illustrated in FIG. 5. Upon invoking the application software of the present invention, a user would be presented with a transition window 601, illustrated in FIG. 6. Invoking the application software occurs by "double-clicking" (described above) on an icon representing the application. In FIG. 6, a first predetermined area 602, is for placing and displaying a first sequence of images, a second predetermined area 603 is for placing and displaying a second sequence of images, a third predetermined area 604 is for placing and displaying a transition template and a fourth predetermined area 605 is for displaying the desired transition sequence. First, a user opens one or more windows that contains dicons for one or more sequences of images, step 501. Such a window that may be utilized is as described in co-pending application, Ser. No. 535,084, entitled "Direct Manipulation Visual Information Editor", filed Jun. 8, 1990, assigned to the assignee of the present invention. The user opens the window through an OPEN command found in the FILE pull down menu, using the technique for utilizing pull down menus described above. This technique is similar to that found in the Finder ™ interface of the Macintosh computer, for opening files. The user then selects the desired first and second sequences of images. This may occur by a well known selecting and dragging technique but may also be performed by other techniques, e.g. through a cut and paste operation. The selecting and dragging technique involves positioning a cursor, controlled by the cursor controlled device, atop the desired source sequence, placing a button associated with the cursor control device in a first down position (which will cause the selected sequence of images to be coupled to the cursor), moving (or dragging) and positioning the cursor onto the desired first or second predetermined area of the transition window 601, and releasing the button associated with the cursor control device into the second up position. The user then opens a window that contains identifiers for one or more transition sequences, step 502. The desired transition operator will be placed in the third predetermined area 604 of window 601. Thereupon, the preferred embodiment will automatically generate the desired transition, step 503, which will be displayed in area 605 of the window 601.

It should be noted that the steps 501 and 502 are interchangeable, i.e. the transition operator may be placed in the predetermined area before the source images sequences. It is only critical that data be in the predetermined areas 602, 603 and 604 before the transition step 503, is performed.

The user must then determine if they are satisfied with the transition, step 504. If they are satisfied with the transition, the transition is saved, step 505. If the transition is not satisfactory to the user, the user then decides if they desire to change the transition template, step 506, for a different transition effect. If a new transition template is desired, the user would again select a transition operator, per step 502. If the user does not desire a new transition effect, the present invention provides a means in which the temporal or timing aspects of the transition may be edited, step 507.

In an alternative embodiment, the window 601 may define a plurality of rows, wherein each row defines areas identical in function to the areas 602, 603, 604 and 605. The user may follow the method described in FIG. 5 to create a plurality of transition sequences. A useful aspect of this embodiment is the ability to concurrently display a plurality of alternative transitions, whereupon the user may choose to save the most desirable of the transitions. It should also be noted that it is apparent from FIG. 6, and also from the description of the alternative embodiment, that the first source sequence of images and second source sequence of images and transition sequence are all viewed by the user from the same display means.

Figure 7:
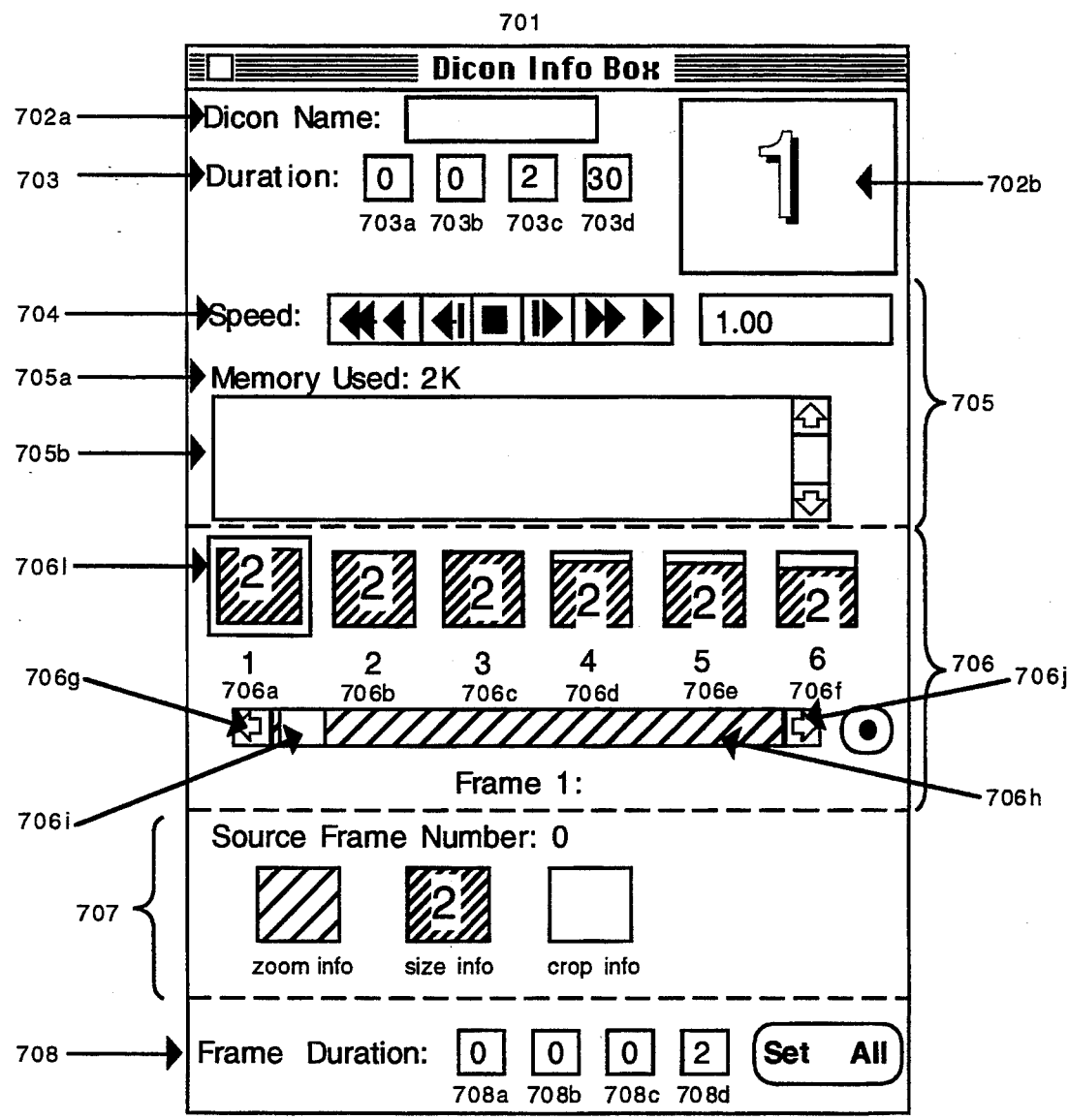
FIG. 7 illustrates a dicon information box window as may be utilized in the preferred embodiment of the present invention.

The preferred embodiment provides means by which a user may change the temporal or timing aspects of the transition template. This function is provided to the user within a menu option entitled GET INFO found in the EDIT pull down menus that is provided when the application is invoked. The display of a pull down menu and the selection of a menu option is as described above. Additionally, in the preferred embodiment, the GET INFO menu option may be directly accessed using the "command I" sequence of keystrokes. Upon choosing to change the temporal aspects of the transition, the user is presented with a dicon information box 701 as illustrated in FIG. 7 "©1991 Apple Computer, Incorporated" (17 U.S.C. 401). The dicon information box 70 provides information about the transition template currently chosen. It is important to note that the dicon information box may be used not only for transitions, but can be used to display information about and modify the temporal aspect of any sequence of images, e.g. a source sequence of images.

The present invention provides two ways by which the timing of a transition may be changed; changing the duration of the entire transition or changing the duration of a particular frame or set of frames within the transition. If the user increases the duration of the whole transition, the transition will slow down proportionally, for example a wipe right switch takes a longer time to move all the way across a screen. Likewise, if the duration is decreased, the entire transition will speed up proportionally.

If the user changes the duration of a particular flame, the particular frame is displayed for an increased/decreased length of time. This has the effect of increasing/decreasing the duration of the entire transition, because the times for the remaining frames remains the same. However, it would be apparent to one skilled in the art to design a system where if the user increases the duration of particular frame(s) of the transition template, the selected frame(s) will be displayed for a longer duration while the remaining frames will "speed-up" and if the duration of particular flame(s) is decreased, the remaining frames will "slow-down". The effect of the latter design would be to keep the transition duration the same.

Referring to FIG. 1 a first area 702 provides identification information concerning the transition, i.e. a textual name 702a and "clip frame sequence" 702b of the transition. A second area 703 provides a means for changing the duration of the entire transition. This area will be described in more detail below. Area 704 provides a means in which the transition sequence may be temporally scanned. The interface to the area 704 is described in greater detail in the aforementioned co-pending application Ser. No. 536,913 entitled "Sequential Information Controller" assigned to the assignee of the present invention. Area 705 provides information concerning the template definition, i.e. the amount of memory required to store the template 705a and comments about the transition 705b. An area 706 provides for the selection of a particular frame, an area 707 provides information on a selected flame and an area 708 provides for editing the temporal aspects of a selected flame.

Referring back to area 703, this area is used to change the duration of the transition. A first box 703a corresponds to hours, a second box 703b corresponds to minutes, a third box 703c corresponds to seconds and a fourth box 703d corresponds to "ticks". In the preferred embodiment a tick is equivalent to approximately 1/60th of a second, but it would be readily apparent to implement a tick as milliseconds, or any other useful measure of time (e.g. for a PAL sequence of images a measure of time of 1/25th of a second would be useful since it corresponds to a frame). A user may change the duration of a transition by positioning the cursor atop the desired box and "clicking" the button associated with the cursor control device. Upon clicking, the desired box will be displayed in inverse video and the time corresponding to that box may be changed. The user may then enter the desired duration for the transition. Upon positioning the cursor outside of the box and clicking, the desired temporal change will be undertaken. Other user interfaces for changing the duration for a transition may be utilized, e.g. by altering a sliding scale or moving the hands of a clock, without departing from the spirit and scope of the present invention.

Area 706 provides a means to select a particular frame. As illustrated in FIG. 7, six (6) frames, labeled 706a-706f, of the transition are displayed, each representing a particular stage of the transition. A selected frame has a border 7061 and it's reference number with respect to the frames 706a-706f is indicated in area 707. In FIG. 7, the frame 706a is selected. A user may select a frame by positioning the cursor atop the frame and clicking the button associated with the cursor control device, whereby the selected frame will be displayed with a border and its frame number displayed in area 707. A scroll bar 706g is provided whereby the transition template may be scrolled. The use of scroll bars is known to users of the Macintosh system. The entire length of the transition template is by definition the length of scroll area 706h so that the relative position of the displayed frames with respect to the entire transition template is provided by the scroll box 706i. Scrolling may be invoked by either dragging the scroll box 706i along the scroll area 706h or by use of the scroll arrows 706k and 706j, respectively. Dragging is accomplished in identical means as described above with respect to selecting source images. To scroll with a scroll arrow, the cursor is positioned atop either of the scroll arrows and the button associated with the cursor control device is placed in the first (down) position. So long as the button is in the first position, scrolling will occur. When the button associated with the cursor control device is released into the second up position, scrolling will terminate. Upon completion of scrolling, the six frames surrounding the location where the scroll box 706i is located, will be displayed in the areas 706a-706f.

Area 708 provides means for editing the temporal aspects of a selected frame. As described above, each frame represents a particular point in time of the sequence of images and that each frame typically represents 1/30th of a second of the video image. The area 708 allows for changing the time of a particular frame so that it may be displayed for a longer or shorter period of time. Thus, it is possible that a frame would be displayed for a greater duration than 1/30th of a second or whatever its standard display time is. The timing areas 708a-708d correspond to those in area 703a-703d, and operation is identical. As an example of changing a frame duration, if the desired transition is causing a titling effect (as will be described below), the point in time where the titles are on the center of the screen may be increased so that the titles will appear centered on the screen for a longer duration. It should also be noted that during the interpolation step the duration of the entire transition is altered to the extent of the change in the selected frame. Thus, both the duration of the transition and the duration of a particular frame are altered to create the desired transition.

Figure 8:
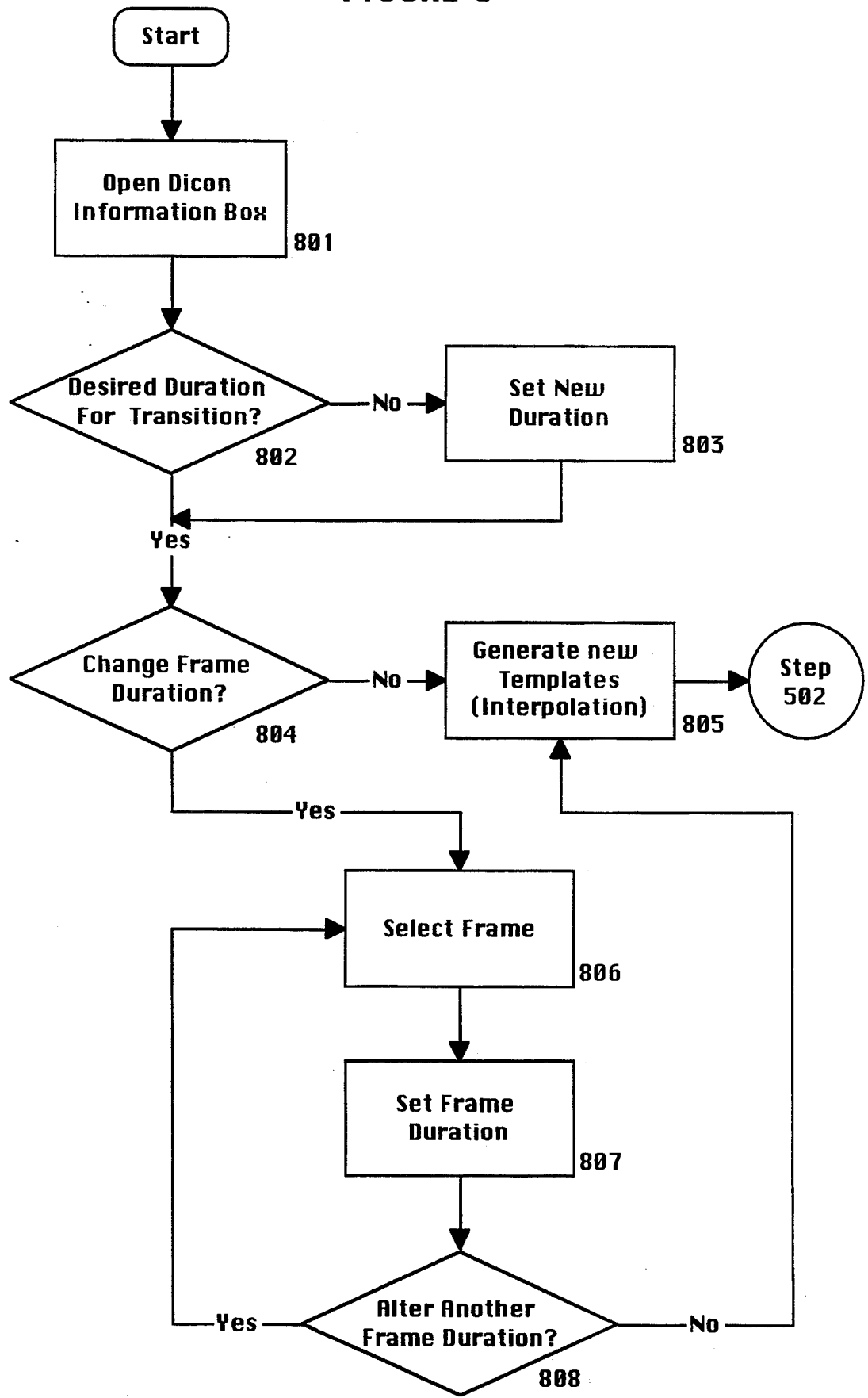
FIG. 8 is a flowchart providing the sequence of operations for changing the duration of a transition or the duration of a frame in the preferred embodiment of the present invention.

FIG. 8 illustrates how a user may typically alter the temporal aspects of a transition template. First, the user must open the dicon information box, step 801. This is accomplished in the manner described above. Next, the user must determine if it is desirable to alter the duration of the transition sequence, step 802. If it is desirable, a new duration is set, step 803. In any event, the next step will be to determine if the duration of any frame(s) is/are to be altered, step 804. If no frame duration is to be altered, the transition template is generated using the interpolation process described below, step 805. If a frame duration is to be altered, the desired frame is selected, step 806. This is accomplished in the manner described above. Once the desired frame is selected, the frame duration is than set, step 807. Once this is completed, the user determines if other frame durations are to be altered, step 808. If no other frame durations are to be altered, than the interpolation process is invoked, step 805. If other frames are to be altered, the desired frame must be selected, step 806, the duration set, step 807 and repeated until all the desired frames are similarly processed.

Referring back to FIG. 5, once the editing of the temporal parameters are completed, step 508, the transition is again performed and displayed, step 503.

Key Color Selection

A second means by which the user may alter the transition is through the selection of one or more key colors. A key color is one that is masked from the source image before it is combined with other source images and a transition template. Another way of thinking of it is that it becomes a transparent color.

A user may select a key color by using a selection tool. In the preferred embodiment Macintosh system, tools for selecting data objects are provided. One such tool is the selection rectangle. The selection rectangles operates by positioning the cursor at the upper left most point of the rectangle with the cursor control device and placing the button associated with the cursor control device in a first (down) position. With the button still in the down position, the cursor is positioned to the lower right most point of the rectangle. While the rectangle is being created, a dashed outline is displayed showing the boundary of the rectangle. When the button associated with the cursor control device is released into the first position, the selection rectangle is completed and the colors within the rectangle are added to the color selection list for that source image sequence.

Key color selection may also occur by other means, e.g. providing a menu to the user at which the user can select the desired key colors. Such other means would provide equivalent function to that found in the present invention.

A natural extension of a key color list is to act as a filter, i.e. one where a first predetermined pixel value is converted into a second predetermined pixel value. For example, a pixel value that is a gray-scale may be converted into a pixel value that represents color. Such an application would be particularly useful when "colorizing" black and white movies that have been digitized.

Transition Template

In the preferred embodiment, a transition template defines how each pixel in each frame of a transition sequence is to be treated. Like the source image sequences, the transition template may be stored on a storage device coupled to the computer system. As will be discussed in greater detail below, a frame in the transition template corresponds to one or more frames in the source sequences of images and defines how the pixels in the corresponding flames are to be treated.

The transition template is used to create a transition sequence frame by following a rule that if a pixel in a transition template frame is in a first state, the corresponding pixel in the corresponding frame of the first sequence of images is displayed, if the pixel in the transition template is in a second state, display the corresponding pixel in the corresponding frame of the second sequence of images, otherwise use a combination of information from corresponding pixels of both sequences of images to create the pixel to be displayed.

Figures 9A, 9B:
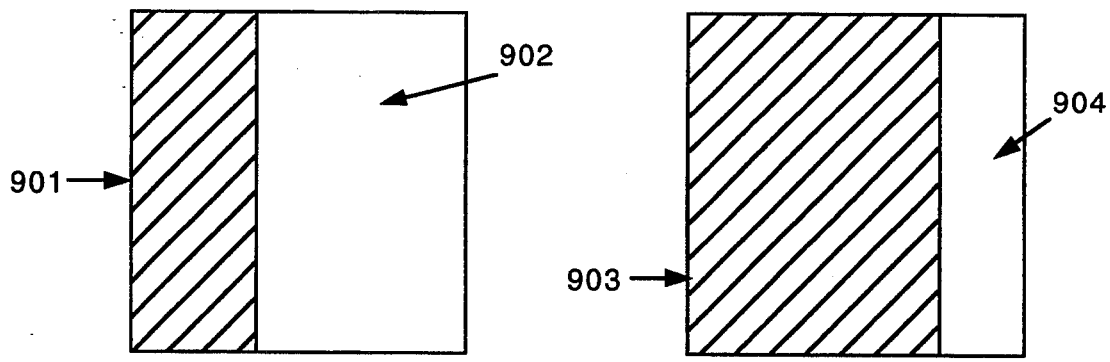
FIGS. 9a–9c illustrate a transition template for a wipe transition as may be utilized in the preferred embodiment of the present invention.
Figure 9C:
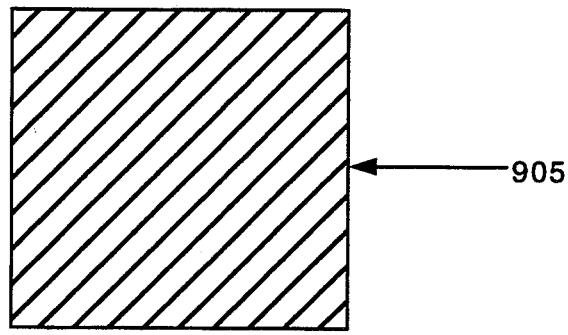

A transition template is illustrated in FIG. 9a–9c. In FIG. 9a a black area 901 comprises approximately ⅓ and a white area 902 comprises ⅔ of the display area. As described above, using a rule that a black pixel represents displaying the second source sequence of images, the FIG. 9a would be displaying ⅓ of a frame of the second source sequence of images while the remaining display would be the leftmost ⅔ of a frame of the first source of images. In FIG. 9b, ⅔ of the template is black area 903 and ⅓ is white area 904. Thus, in FIG. 9b, the display would have ⅓ showing a frame from the first source sequence of images and ⅔ showing a frame from the second source sequence of images. Finally, in FIG. 9c, the entire template is black area 905 indicating that only a frame of source image sequence 2 would be displayed.

A special use of the transition template is to create fades or dissolve transitions. The transition template is generated in a monochrome or grayscale format. So, to produce one transition frame from a frame from the first source sequence of images (call it i1_1), a corresponding frame from the second source sequence of images (call it i2_1), and transition template frame tt_1, where tt_1 has grayscale pixels, a second rule is as follows: for each pixel in tt_1, calculate the percentage of black it contains (call it p%), then use 1—p% of the color value of the corresponding pixel from frame i1_1, and use p% of the color value of the corresponding pixel from frame i2_1.

For example, to create a fade to black over 30 frames, the second source sequence of images would be 30 black frames (or one black frame, reused 30 times). The first frame of the transition template is all white, the second frame is a very light grey, the third is a bit darker gray, the 15th is a medium grey, the 25th is a dark grey, and the 30th is black. At the first frame of the transition, each pixel in the transition template is 100% white, so for each pixel in the first frame of the transition we would use 100% of the color value of the pixels from the first source sequence of images and 0% of the color values of the pixels from the second source sequence of images. But at the 15th frame of the transition, each pixel in the transition template is 50% grey—that means at each pixel in transition frame 15 we would use 50% of the color value of the corresponding pixel in the first sequence of images and 50% of the color value of the corresponding pixel of the second sequence of images. At the 30th frame of the transition only the second sequence of images is displayed, i.e. 100% of the second source sequence of images, and 0% of the first source sequence of images, since the values of the pixels in the transition template at frame 30 are 100% black.

This same transition template would be a dissolve transition if the second source sequence of images was other than a single color, e.g. another sequence of images. Here, the first sequence of images would dissolve into the second sequence of images.

The case where transition templates only contain two-value (black-or-white-only) pixels, is just a subcase of the more general grayscale transition template—each pixel of a two-value transition template copies either 0% or 100% of the corresponding image pixels to a transition frame.

The creation of a transition template may occur in different ways, but two are typical. First, since any sequence of grayscale images may act as a transition template, any means by which a sequence of images can be created can be used as a transition template. For example, a sequence of images that was created by a prior transition, may be used as a transition template. The second way is through the use of a transition resource. The transition resource is discussed in greater detail below.

Timing Aspects of a Transition

A transition takes place over a predetermined period of time. As described above, the preferred embodiment utilizes a transition template and uses its information to generate the frames for a transition sequence.

The user controls the transition template in order to determine the transition effect between the two sources. In the preferred embodiment, a last part of a first source sequence of images (source sequence A) is combined with a first part of a second source sequence of images (source sequence B). For example, if source sequence A is a 10 second sequence and source sequence B is a 5 second sequence and the transition template takes two seconds, the last 2 seconds of source sequence A will be combined with the first 2 seconds of source sequence B. The resulting sequence of images resulting from the merging of Source sequence A with Source sequence B would last 13 seconds.

Figure 10A:
FIGS. 10a–10b illustrate the timing of a transition sequence as may be utilized in the preferred embodiment of the present invention.
Figure 10B:
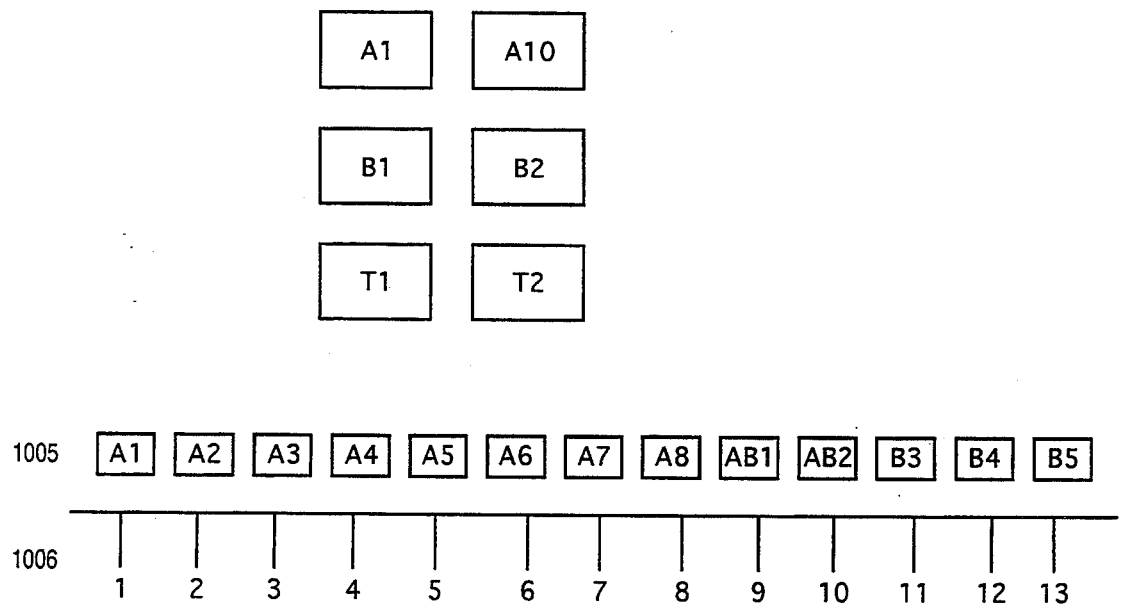

This is further illustrated by the timelines in FIGS. 10a-10b. In FIG. 10a a source sequence A 1001 is a 10 second sequence, source sequence B 1002 is a 5 second sequence and transition template 1003 is a 2 second sequence. For simplification and clarity, each one second clip of the sequences 1001, 1002, 1003 is represented in FIG. 10a-10b as a single frame. Each of the single frames in FIGS. 10a-10b represents 1 second of video and may be comprised of 30 frames (in accordance with the NTSC standard) or 25 frames (in accordance with the PAL standard). In any event, source sequence A 1001 is comprised of 10 frames labeled A1-A10, source sequence B 1002 is comprised of 5 frames labeled B1-B5 and transition template 1003 is comprised of 2 frames labeled T1-T2. A timeline 1004 is also provided to denote the duration of a frame and/or sequence of images.

FIG. 10b illustrates a transition sequence of the preferred embodiment. As described above, a last part of the first sequence of images (here source sequence A) is combined with a first part of the second sequence of images (here source sequence B), the duration equaling the duration of the transition template. The frame A9 and B1 are combined based on the contents of transition template frame T1 to create transition sequence frame AB1. Likewise, the frame A10 and B2 are combined based on the contents of transition template frame T2 to create transition sequence frame AB2. The resulting merged sequence of images 1005 would consist of frames A1-A8, AB1-AB2 and B3-B5 and as illustrated by a timeline 1006, would have a total duration of 13 seconds.

In some instances the total duration of frames in a source sequence of images will be less than the total duration of frames in the transition template. In these instances, there will be reuse of frames from the source sequence of images which has less duration than in the transition template. In the preferred embodiment a technique where each frame is used once, and when all frames have been used, the last frame is reused, has been employed. For the first source of images, each frame is used once, and the last frame is repeated, but for the second source of images, the first frame is reused for a sufficient amount of time until the rest of the frames can be used once. Alternatively a technique whereupon the reuse of each frame is averaged over the required reuse time may be utilized. For example if the first source sequence of images takes up 5/30th of a second and has 5 frames and the transition template takes up 15/30th of a second and is comprised of 15 frames, each frame in the first source sequence of images is used 3 times. Utilization of alternative reuse schemes would not depart from the spirit and scope of the present invention.

It should be noted that if the first source sequence of images is a still image, i.e. consisting of a single frame, this image is repeatedly combined with the second source sequence images for the duration of the transition template. If both the first and second source sequences are still images, the images would be combined as defined by the transition template, to create a transition sequence of images.

There may also be cases where a single transition frame corresponds to more than one frame in a source sequence of images. This may occur for example when a first source sequence of images is in NTSC format (30 frames per second) and the second source sequence of images is in PAL format (25 frames per second). This may also occur when a source sequence of images is created and the duration of a frame in the transition template has been altered, thus creating a frame in the sequence that is displayed for a longer (or shorter) period of time than the remainder of the frames. In these instances, a transition template is created that accommodates for these deviations by either the addition, omission or extension of duration of template frames.

It should be noted that due to the fact that the data is in a digital representation, where each frame is stored separately, it would be apparent to one skilled in the art to transition from the first source sequence of images to the second source sequence of images, at different points of the respective sequences. Thus it would be apparent to be able to transition, for example, in the middle of the first source sequence of images and the middle of the second source sequence of images.

Figure 10C:
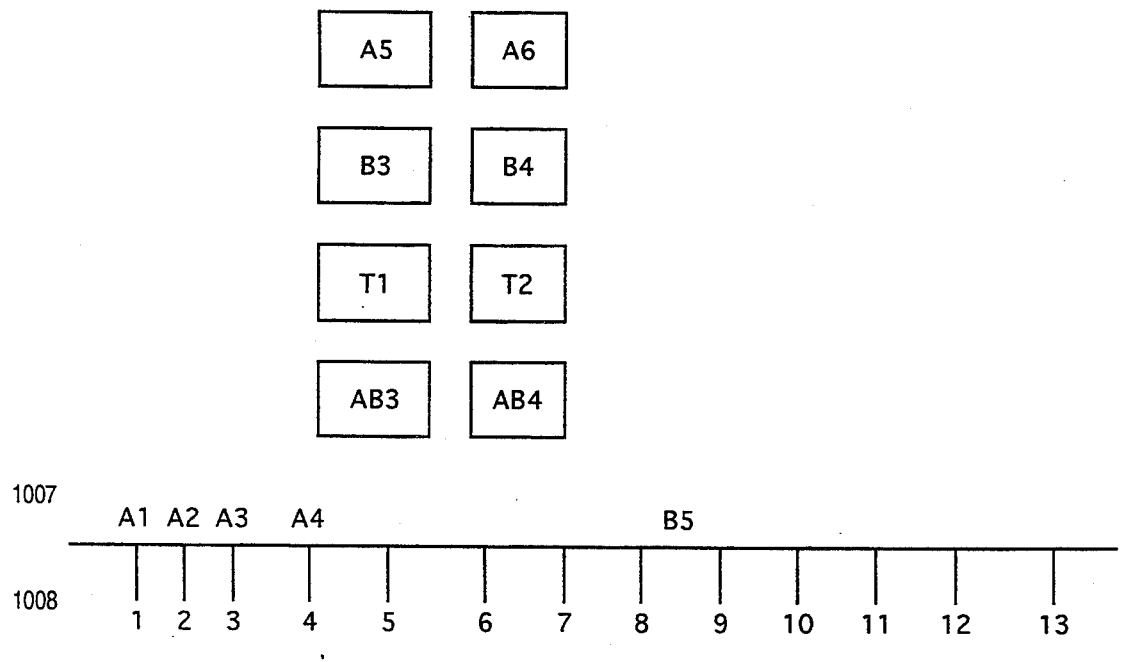
FIG. 10c illustrates the timing of a transition sequence as may be utilized by an alternative embodiment of the present invention.

The timing of such a transition is illustrated in FIG. 10c. In FIG. 10c, the transition is occuring starting at frame A5 of source sequence A and starting at frame B3 of source sequence B. The frame A5 and B3 are combined based on the contents of transition template frame T1 to create transition sequence frame AB3. Likewise, the frame A6 and B4 are combined based on the contents of transition template frame T2 to create transition sequence frame AB4. The resulting merged sequence of images 1007 would consist of frames A1-A4, AB3-AB4 and B5 and as illustrated by a timeline 1008, would have a total duration of 7 seconds.

Description of the Transition Resource

The preferred embodiment Macintosh system makes extensive use of shared software tools. Collectively, these tools are termed resources. Resources may be utilized by any software program which has access to them. Resources include application code, menus, fonts or icons. The concept of resources is described in greater detail in the publication "Inside Macintosh" a publication of Addison Wesley Publishing Company, Inc. and are well known to programmers of Macintosh compatible software. In the present invention a transition resource provides for the creation and modification of transition templates. The transition resource of the preferred embodiment is comprised of a data structure and application code which provides for the creation of transition templates and transition sequences. It should be noted that that the transition resource is used to create a transition template dynamically. The transition template is created dynamically in order to save storage space in the computer. This is particularly useful when a user is using many transition templates. A transition template is generated as a result of initiating a transition between a standard first image and a standard second image to create a transition dicon. The transition resource further allows for the modification of a transition from both a temporal and spatial viewpoint.

To utilize the transition resource, a transition resource "type" is defined. Type is a term familiar to those skilled in the art of software programming and refers to characteristics of data, e.g. an integer or character value. The transition resource type provides a consistent format through which the underlying application code which provides for the creation of transition templates can be shared. Thus, a data element of the type transition resource defines a transition.

The underlying application code of the transition resource processes a data element of the type transition resource utilizing three fundamental operations; selection, mapping and interpolation, all of which are described in greater detail below. Briefly, selection is the choosing of regions within areas representing a source sequence of images, i.e. source image areas, which will be combined to create a transition sequence. Mapping is the placement source image areas at locations in relation to an area representing what will be viewed by the user as output, i.e. an output image area. Interpolation is the estimation of intermediate states of selected regions and source images areas both temporally and spatially.

The transition resource type is described with respect to Chart A.

transition definition to create a transition template. The data to be provided in the transition definition must be in a proper format and of a proper type (e.g. an integer, array, etc.) to create a transition template. The resource transition resource type of Chart A illustrates the format that a transition resource data element must be in. It would be apparent to one skilled in the art to utilize an alternate format, without departing from the spirit and scope of the present invention.

Referring again to Chart A, the name of the resource is found on line 1. Here, the name of the resource is

CHART A

| Line No. | | |
|---|---|---|
| 1 | type 'TRNS' { | |
| 2 | byte; | // bit depth |
| 3 | byte firstOnTop = 0, secondOnTop = 1; | // who uncovers whom |
| 4 | integer; | // width |
| 5 | integer; | // height |
| 6 | integer = $$Countof(Image1RectList); | |
| 7 | array Image1RectList{ | // image 1 trajectory |
| 8 | Rect; | |
| 9 | } | |
| 10 | integer = $$Countof(Image2RectList); | |
| 11 | array Image2RectList{ | // image 2 trajectory |
| 13 | Rect; | |
| 13 | } | |
| 14 | integer = $$Countof(TransitionList); | |
| 15 | array TransitionList { | |
| 16 | integer = $$Countof(TweenList); | |
| 17 | array TweenList { | |
| 18 | switch { | |
| 19 | case RectTween: | |
| 20 | key integer = RectTweenKey; | |
| 21 | integer; | // dissolves |
| 22 | integer; | // dissolves |
| 23 | integer; | // dissolves |
| 24 | Rect; | |
| 25 | Rect; | |
| 26 | case IrisTween: | |
| 27 | key integer = IrisTweenKey | |
| 28 | integer; | // dissolves |
| 29 | integer; | // dissolves |
| 30 | integer; | // dissolves |
| 31 | Point; | |
| 32 | integer; | |
| 33 | Point; | |
| 34 | integer; | |
| 35 | case PolyTween: | |
| 36 | key integer = PolyTweenKey; | |
| 37 | integer; | // dissolves |
| 38 | integer; | // dissolves |
| 39 | integer; | // dissolves |
| 40 | integer = $$Countof(StartPointList); | |
| 41 | array StartPointList { | |
| 42 | Point; | |
| 43 | } | |
| 44 | array EndPointList { | |
| 45 | Point; | |
| 46 | }; | |
| 47 | }; | |
| 48 | }; | |
| 49 | }; | |
| 50 | }; | |

Chart A illustrates the transition resource type definition as utilized by the present invention. In the preferred embodiment Macintosh system, the REZ programming language may be used to define resources. The REZ programming language is a PASCAL derivative, which was developed by Apple Computer explicitly for the definition of resources. Other computer systems may require the use of other programming languages to define resource equivalents. Such use of other programming languages would not depart from the spirit and scope of the present invention. As discussed above, the transition resource utilizes information provided by a "TRNS". Lines 2-3 are used to provide optimization information to the underlying application code that is processing the transition resource data type. On line 2, the data provided will signal whether the transition template to be generated will contain dissolve values. If there are no dissolve values, that portion of the application code is bypassed. On line 3, a determination of which of the two sequence of images is "on top" when the two are overlaid within an output image area, is made (the output image area is described in more detail below with respect to lines 4-5). Selected regions of the source image area that are "on top" are displayed within the output image area when no dissolve parameters are defined (what happens when dissolve parameters exist is described in more detail below with respect to color mapping). The "on top" determination minimizes processing by presuming that the entire source image area that is not "on top" is selected. Thus, selection of objects from both source image areas is not required. For example, an iris-out switch would be defined with the second sequence of images "on top". In an iris out the second sequence of images grows outward from a predetermined point to cover the output image area and overlay the first sequence of images. In an iris-in, the first sequence of images is "on top". In an iris-in the first sequence of images contracts inwards towards a point uncovering the second source sequence of images.

Lines 4-5 define the base dimensions of the output image area. The output image area provides two functions; it represents the area or "movie screen" through which the sequence of images are viewed, and its definition provides a frame of reference for interpolating selected objects. In the preferred embodiment, the output image area is a rectangle, but alternative shapes would not depart from the spirit and scope of the present invention. Such alternative shapes would be provided by modifying the underlying code which interprets lines 2-5. In any event, the output image area is an area on a coordinate plane, e.g an X-Y plane, through which the transition sequences of images of the preferred embodiment, may be displayed on a display device. It should be noted that only when a source image area (described below) or a portion of a source image area, overlays an output image area, may it or a portion of it, be displayed.

The values defined on lines 4 and 5 do not reflect actual dimensions of a source sequence of images. A transition will be displayed using the dimensions of either the first or second source sequence of images. As described above, these values act as base reference points to which values provided later, e.g. in the description of the selection objects, are relative. For example, if a the values in lines 4 and 5 define a rectangle of dimensions 80×60 and a selection object defines a start rectangle of dimensions 20×15, it is apparent that the selection objects comprises an area that is 25% that of the output image area. Thus, if the true sequence of images has dimensions 100×100, the selection object would thus maintain the relationship and comprise 25% of the true sequence of images. This is done in order to support source sequences of images or an output sequence of images, of any dimensions.

As described above, the transition sequence will be displayed with the dimensions of either the first or second source sequence of images. In the preferred embodiment, the first source sequence of images and the second source sequence of images need not have the same dimensions. In such situations, the present invention detects the different dimensions and provides means for allowing the user to decide which of the source sequence of images will define the dimensions for the output sequence of images.

Lines 6-9 require information concerning a first source image area and lines 10-13 require information concerning a second source image area. This information includes the shape and dimensions of the source image area, and its trajectory, i.e. whether the source image area moves through the output image area. Generally, a source image area will have a rectangular shape that will correspond to the output image area. From a conceptual viewpoint, a source image area represents an area through which portions of flames within a sequence of images may be selected for viewing. As described above, the entire source image area of one sequence of images is selected while only a portion(s) of the other source image area is/are selected. As will be discussed below in greater detail with respect to mapping, a source image areas position may change over time. When portions of a source image area overlay with the output image area, they may be viewed depending on other criteria defined by the transition resource.

The lines 15-50 are used to define a selection object list for the transition. The selection objects will be applied to the source image area that is "on top" (see line 3). The data structure of the object list is a Transition List array of TweenList array elements, i.e. it is an array where the elements themselves are arrays. With this structure, the TransitionList array elements are processed sequentially in time, while the Tweenlist array elements, i.e. the "primitive" objects, are processed concurrently in time.

Three "primitive" objects are defined; RectTween (for a rectangle starting at line 19), IrisTween (for an iris starting at line 26), and PolyTween (for a polygon starting at line 35). These "primitive" objects in turn further utilize other application code which performs the transitioning functions of selection, mapping and interpolation, which are described below. A transition definition will define one or more "primitive" objects.

The "primitive" objects as implemented in the preferred embodiment, utilize the Macintosh QuickDraw tools and the premises upon which QuickDraw operates. QuickDraw tools provide an easy means for performing highly complex graphic operations very quickly. The QuickDraw toolkit is described in detail in the aforementioned Inside Macintosh publication. It should be noted that QuickDraw allows for the definition of a plurality of different object types. Utilization of such alternate object types may be easily incorporated into the present invention through their definition within the "TRNS" resource type. Other geometric objects not defined by Quickdraw may also be utilized, e.g. COONS patch. Moreover, the utilization of any means for creating objects, e.g. QuickDraw equivalents, or a specifically created object editor, would not depart from the spirit and scope of the present invention.

Figure 11:
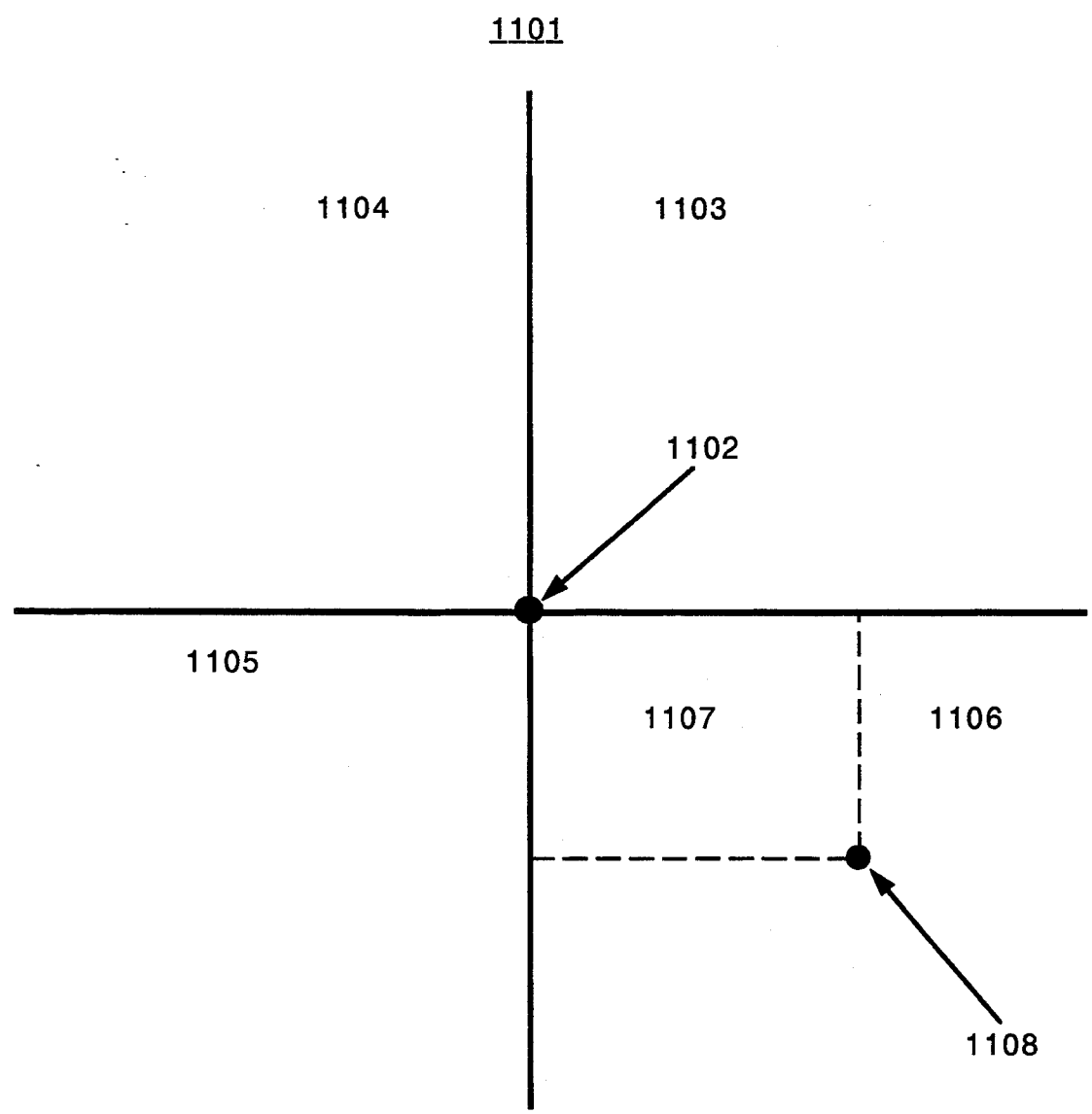
FIG. 11 is an X-Y coordinate plane describing the spatial reference that may be utilized in the preferred embodiment of the present invention.

The QuickDraw tools operate with respect to a two-axis, X-Y coordinate system. In FIG. 11, an X-Y coordinate plane 1101 is illustrated. Based on historical practice, the X-Y coordinate plane for graphical applications is defined so that in the Y coordinate, all values above the X-axis are negative and all values below the x-axis are positive. In the preferred embodiment, the unit of measure of the coordinate plane is pixels. The point 1102 of the coordinate plane 1101 represents the point (0,0) on the plane 1101. Thus, the coordinate plane 1101 can be viewed as having an upper right quadrant 1103, an upper left quadrant 1104, a lower left quadrant 1105 and a lower right quadrant 1106. The values in the upper right quadrant 1103 will have a width value of greater than or equal to zero and a height value of less than or equal to zero, in the upper left quadrant 1104 will have a width value of less than or equal to 0 and height value of less than or equal to zero, values in the lower left quadrant 1105 will have width values of less than or equal to zero and height values of greater than or equal to zero and values in the lower right quadrant 1106 will have width values greater than or equal to zero and height values greater than or equal to zero. In the lower right quadrant 1106 of the coordinate plane a rectangular area 1107 is defined. It should be noted that a rectangle in a coordinate plane system can be defined by two points; the rectangular area 1107 is defined by a top left point 1102 (0,0) and a bottom right point 1108. In the preferred embodiment, the bottom right point 1108 is at location (80,60).

In the preferred embodiment, objects and regions are internally converted to percentages of the output image area, with a specified start point. This allows for the use of interpolation algorithms that are independent of the actual source image or output image area geometries. This is accomplished by conceptually treating the definition of the output image area as a denominator and the definition of an object as a numerator. For example, if the output image area is defined as a rectangle, with a top left point of (0,0) and a bottom fight point of (80,60) and a region referring to the upper left quarter would be defined with a top left point of (0,0) and a bottom right point of (20,15), would be internally transformed to describe a rectangle with a top left point of (0,0) and a bottom fight point of (0.25, 0.25). The internal transformation is accomplished by treating the definition of the first rectangle as having dimensions 80×60 and the region having dimensions 20×15 and determining the relationship, i.e. the percentage of size, between the two.

Each of the "primitive" objects utilizes a QuickDraw data type. The RectTween "primitive" utilizes the QuickDraw RECT data type. The RECT data type is comprised of two sets of data items which represent two points on an X-Y coordinate system described above. A first set of data items represents the upper left most point while the second set of data items represent the lower fight most point. Two RECT data definitions are required (SEE LINES 24–25), which represent the begin and end state of the object. As discussed above, the data provided in the RECT data definitions will be in relationship to the source image.

For IrisTween, a POINT data type along with an integer representing a radius are used to define a circle. Again, two circles are defined, the first at lines 31–32 and the second at lines 33–34. The two circles represent the begin and end state of the object and are defined in relationship to the source image.

For PolyTween, the POINT data type is used to define a set of points which make up a polygon. Again, two polygons are defined, the first at lines 41–43 and the second at lines 44–46. The two polygons represent the begin and end state of the object and are defined in relationship to the source image.

In each of the "primitive" object definitions, three integer dissolve values are defined. The dissolve values provide the information necessary for determining a pixel value, when the pixel will be derived from combining corresponding pixels from the two source image sequences. For example, with respect to RECTWEEN, on lines 21, 22 and 23, the integer value on line 21 represents a begin state, the integer value on line 22 represents an end state, and the integer value on line 23 represents a denominator value to which the values on lines 21 and 22 are associated. The denominator value allows for creating end states of fractional values where a combination of the pixels are being displayed. This allows for using a second transition in a transition list to complete the switch from the first sequence of images to the second sequence of images. The dissolve values only have meaning when a numerator value is combined with a denominator value. The generated values represent the object index as described above, where a 0 value represent showing the pixels from the first sequence of images and a 1 value represents showing pixels from the second sequence of images.

As an example of use of the dissolve values, suppose the value on line 21 is 0, the value on line 22 is 1 and the value on line 23 is 1. At the beginning of the transition the object index value is the value of line 21 divided by the value of line 23 or 0/1 or 0. Thus, only the pixel values from the first sequence of images are used to determine the value of a displayed pixel during the transition. At the end of the transition, the object index value is the value of line 22 divided by the value of line 23 or 1/1 or 1. Thus, only the pixel values from the second source sequence of images are used to determine the value of a displayed pixel during the transition. If the value on line 23 is 2, at the end of the transition, the object index value would be $\frac{1}{2}$, thus the pixel value as displayed would be based on $\frac{1}{2}$ the pixel value from the first source sequence sequence of images and $\frac{1}{2}$ the pixel value from the second source sequence of images.

An analogy to the resource type definition is the structured data type. Structured data types are utilized in the PASCAL and C programming languages. A structured data type is typically comprised of several fields of different data types (e.g. integer, real or array) and has the attributes of being user definable and dynamic. The structured data type is dynamic in that a data element of that type may only have access to certain fields defined by the data type. The access to those fields being dependent on the value of a predefined key value. Similarly, the transition resource type definition describes a plurality of "primitive" transition types (or data types). The actual transition characteristics would be dependent on particular keys, in this case the names of the "primitive" transition types.

The transition resource definition is useful in that it provides a means by which objects can be dynamically defined. What is required is the definition of a data element of the transition resource type.

The transition resource type described in Chart A, is specific in the sense that objects may be selected from only one of the source image areas. A transition resource type may be defined so that selection may occur from both source image areas or a transition resource type may be defined so that different selection objects may be utilized.

An alternative means for creating a transition resource rather than using a resource type as described above would be to provide a graphical editor, e.g. much like those found in Draw or Paint software applications. Such alternative means for creating a transition resource may simplify the creation of a transition resource.

Transition Resource Data Element

A transition resource data element is a data item that is of the type TRNS. The specific data format of a transition resource data element is illustrated in Chart B.

CHART B

| | |
|---|---|
| 1 | resource 'TRNS' (Transition name, "Transition name", purgeable/nonpurgeable){ |
| 2 | Pixel Depth, |
| 3 | Source Image that is on Top, |
| 4 | Width of output image frame, |
| 5 | Height of output image frame, |
| 6 | {{First Source Image Area Begin State}, {First Source Image Area End State}, |
| 7 | {{Second Source Image Area Begin State}, {Second Source Image Area End State}, |
| 8 | { |
| 9 | Object List |
| 10 | }; |
| 11 | }; |

On Line 1, the resource type specification as well as the resource name are provided. Also, there is a purgeable/nonpurgeable selection. This refers to whether or not the code may be purged from memory when it is no longer executing. Line 1 provides information that is common to data elements for resources and is a format well known to developers of Macintosh compatible software.

Line 2 specifies the pixel depth. Pixel depth is a signal that the transition data element includes dissolve data. It is desirable to designate that a transition does not include dissolve data, since it will cause the transition resource sequence Application code to bypass processing concerning fades or dissolves. Line 3 specifies which source image will be "on top". Typically, source image 2 will overlay source image 1, but there may be circumstances where it would be advantageous where the source image I would overlay source image 2 (e.g. see the description of an iris-in transition below).

Line 4 specifies the width and line 5 the height of the output image area, measured in pixels. Typically, the width will be 80 and the height 60. As described above, the output image area as utilized here merely provides a frame of reference to the which the pixels in the source image area relate. Line 6 defines the object for source image 1 and line 7 defines the object for source image 2. The objects for source image I and source image 2 define trajectories of the respective source images through the output image pseudo-rectangle. As described above, trajectory refers to the visually apparent movement of the source image through the output image pseudo-rectangle.

Line 8 represents the beginning of the object list. The object list defines the geometric shapes from which regions will be selected for display from both the first and the second source image areas. The geometric shape chosen will dictate the data that would be provided.

For a rectangle, the object definition would look as follows:

```
RectTween {
    Begin Dissolve Numerator Value,
    End Dissolve Numerator Value,
    Dissolve Denominator Value,
    {Begin State of Rectangle}
    {End State of Rectangle}
}
```

For an iris, the object definition would look as follows:

```
IrisTween {
    Begin Dissolve Numerator Value,
    End Dissolve Numerator Value,
    Dissolve Denominator Value,
    Begin State of Iris,
    End State of Iris
}
```

The state of the Iris would be defined as a Point, i.e. {x-coordinate, y-coordinate} and a radius. An example for a circle with radius 1 would be {0,0},1.

For a polygon, the object definition would look as follows:

```
PolyTween {
    Begin Dissolve Numerator Value,
    End Dissolve Numerator Value,
    Dissolve Denominator Value,
    Begin state of polygon,
    End state of polygon}
```

The state of the polygon would be defined in terms of a set of points. The points would be connected sequentially to define the desired polygon.

Charts C-E described below with respect to specific examples of transitions exemplify transition resource data elements.

As described above, the basic flow of creating a transition template involves the steps of selection, mapping and interpolation. Individually, each of these steps are known in the art of switching. Collectively, they have not been used together in the manner of the present invention. These steps are described in greater detail below.

Selection

Figure 12A:
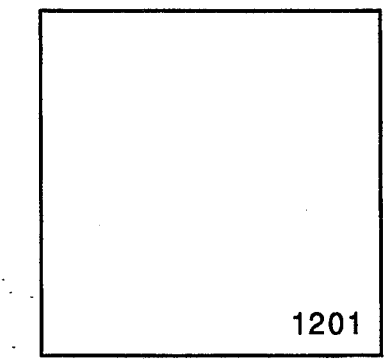
FIG. 12a illustrates a source image area as may be utilized in the preferred embodiment of the present invention.
Figure 12B:
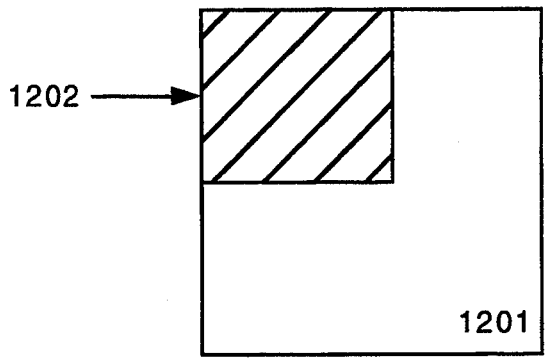
FIGS. 12b–12e illustrates selected regions of a source image area as may be utilized in the preferred embodiment of the present invention.
Figure 12C:
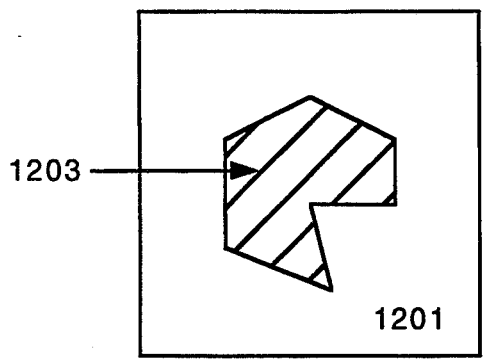
Figure 12D:
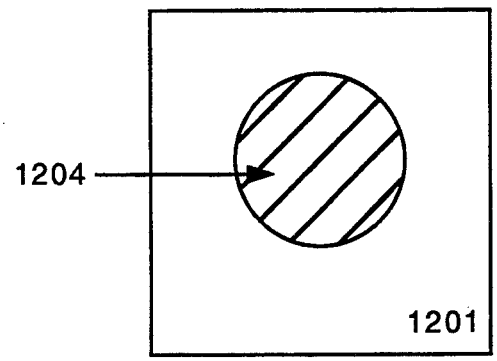

Selection is the process in which regions of a source image area are defined. The source image area to which regions are selected is determined by the "on top" parameter (line 3 of Chart A). Recall that except in the cases where dissolve parameters are defined, the selected regions of the source image area that is "on top" and within the output image area, will be displayed. Selection occurs during the creation of the transition template. In the preferred embodiment, selection is determined in two separate ways, by region and by color. FIG. 12a–12f illustrate concepts with regards to selection by region. FIG. 12a illustrates a source image area 1201. A source image area 1201 is a predefined area which represents a source sequence of images to be displayed. Two source image areas are defined by the transition resource type at lines 6–13 of Chart A. FIG. 12b illustrates a selected region, i.e. rectangle 1202.

Figure 12E:
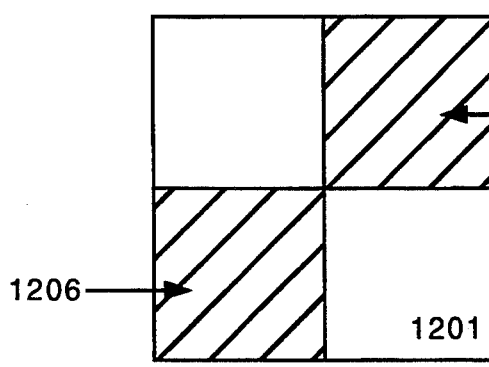
Figure 12F:
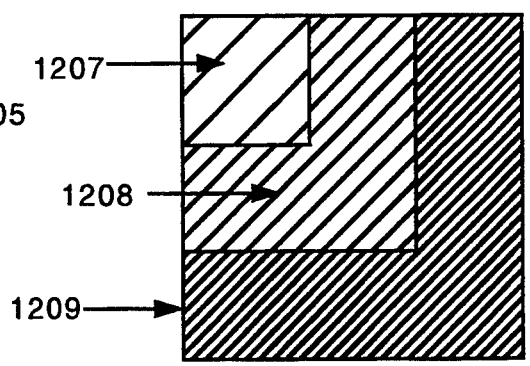
FIG. 12f illustrates an object in a beginning, intermediate and end state as may be utilized in the preferred embodiment of the present invention.

As described above, a selected region is by definition, portions of the source image area that may be displayed. A selected region is comprised of one or more objects; in effect, selection objects create selected regions of the source image area. In FIG. 12b the object is a rectangle, but may be other geometric shapes including polygons (Polygon 1203 illustrated in FIG. 12c) or ovals (Oval 1204 illustrated in FIG. 12d). FIG. 12e illustrates a selection region of two objects (rectangles 1205 and 1206).

Selected regions (via their corresponding selection objects) may vary over time. This enables various other types of special transitions. The variance over time is accomplished by defining a begin and an end state for an object via a selection object. Thus, in FIG. 12f, a rectangle 1207 defines a begin state of an object, rectangle 1208 defines an intermediate state of the object and rectangle 1209 defines the end state of the object. The rectangle 1208 was defined during the interpolation process which is described in more detail below. In the case of an opening iris (an "iris switch"), a selection object will comprise a first circle having a typically small diameter (begin state) and a second circle which typically has a diameter that is much larger than the source image area (end state).

In the preferred embodiment, the above definition applies to and is utilized by all source image sequences. A related concept is that of the output image area. As described above, the output image area is defined as the area through a sequence of images may be displayed. Only when a selected region of a source image area overlays the output image area, may that selected region be displayed. Thus, even though a selection object is larger than the output image area, only the portion within the output image area may be displayed. Within the output image area, the merging of the portion of the first sequence of images which will be transitioned, the portion of the second sequence of images which will be transitioned and the transition template will occur to create a third sequence of images (the transition sequence).

Selection by color is done "negatively". In selection by color, a list or range of colors is specified. As discussed above, this is accomplished by using a "selection rectangle" on an area of the source image so that all colors within the selection rectangle are placed on the color selection list. The colors on the selection list are termed key colors. Any pixel with a color value that matches a color from the list is removed from the selection region. For example, if the color selection list of source image 2 contains the color blue, all the blue pixels of a selected region of source image 2 are masked out so that the corresponding pixels from source image 1 are displayed. In other words, the blue pixels in the selected region of source image 2 are treated as being transparent.

However, it would be apparent to one skilled in the art to use selection by color "positively". A positive use would only allow the pixels of a source image that are on the color selection list to be displayed and all other pixels would be masked out. It would also be apparent to one skilled in the art to provide for the color selection list to change over time.

Interpolation

Interpolation refers to the process where intermediate states of 1) a selection region, via a selection object, 2) the trajectory of a source image area and 3) dissolve values are defined. In the interpolation process of the preferred embodiment, for most types of transitions interpolation occurs over time. In the case of a dissolve or fade switch the interpolation occurs over time, space and color.

As a video image is a sequence of static images, movement or animation can be perceived through changes in size or position of an object. The interpolation process takes as input the object definitions, (i.e. the begin and end states of the selection object) and processes them to define intermediate states for the objects. For example, if an object is defined as a rectangle with a begin state that has dimensions of 10×10 and an end state of 20×20, intermediary states would include rectangles with dimensions 11×11, 12×12, 13×13, etc. until the end state of 20×20 is reached. The exact number of intermediate states that are created is dependent on the interpolation method, the duration of the transition and on user defined parameters, e.g. extending the duration of particular flames. Typically, the begin state will be at time 0 and the end state will be at the end of the transition duration. For example, if the transition duration X is 3 seconds, based on the NTSC standard of 30 frames per second, 90 frames must be created (or interpolated). During the 90 flames, intermediary states of an object(s) are created in equal parts so that the transition occurs smoothly. Techniques for creating a smooth interpolation are known in the art. These intermediary states are recalculations of the position of the object in terms of the X-Y coordinates described above and with respect to the beginning and ending states of the object.

In the preferred embodiment, the default time for a transition is 2 seconds (or 60 NTSC frames). Thus, during the interpolation process, the time parameter will be 2 seconds. However, this parameter may be altered through the methods described above for changing the durations of the entire transition or an individual frame within the transition. Although the preferred embodiment utilizes a linear interpolation algorithm, other non-linear algorithms may be utilized without departing from the spirit and scope of the present invention. Such non-linear algorithms may create such effects as accelerated transitions at beginnings, ends or during the middle of a transition sequence.

Mapping

Mapping take either of two forms: spatial or by color. Spatial mapping refers to the placement of the source image areas in relation to the output image area. Spatial mapping allows arbitrary regions of source material to be placed at a particular location in the output image area while color mapping provides for determining pixel values when the two source image areas overlap within the output image area.

For spatial mapping, in many transitions, the first source image area and the second source image area completely overlay the output image area and the determination of which images are displayed depends on the "on top" parameter and the selected regions. However, as described above, the source image area has a trajectory defining a begin state and an end state. Thus, the source image area mapping with respect to the output image area, may change over time. For example, in a left to right push switch the first source image area moves from left to right while simultaneously the second source image area moves into the space vacated by the first source imaged area. This has the effect of the second sequence of images "pushing" the first sequence of images out of the output image area.

The source image area may be defined to create a push effect in any direction. Thus, the spatial mapping may cause movement of the source image that goes from left to right, right to left, up to down, down to up, or diagonally. As with selected regions, intermediate source image areas are created via interpolation throughout the transition.

Color mapping occurs when material from two sources overlaps in the output image area and dissolve parameters are defined. In color mapping the dissolve parameters of a selection object are interpolated in the manner described above to create an object index associated with each intermediate state (or frame of the transition template). The preferred embodiment utilizes a rule that if source A's object index is 1.0 and source sequence B's object index is 0, source A is visible. If A's object index is 0 and B's object index is 1.0, object B is visible. If each object index is 0.5, each pixel from the two sources is combined and the average color is determined—this is a cross-fade. In the simplest fade, where image B gradually becomes visible through image A, the selected region is the entire source image area. The spatial mapping of the respective source image areas is directly to the output image area. The index for rectangle A starts at 1.0 and gradually decreases to 0), while the index for rectangle B starts at 0 and gradually increases to 1.0.

It should be noted that other rules, e.g. if the object index is 1 the first sequence of images is displayed, may be employed without departing from the spirit and scope of the present invention.

Specific Examples of Transition

What follows are specific examples of transitions that are utilized within the preferred embodiment. However it should be noted that it would be readily apparent to one skilled in the art that the methods and techniques described above may be used equally with digital audio data. Typically, the frames comprising a sequence of images also contains digital audio data. Thus, the digital audio data may be manipulated in a manner as described above with respect to digital video data. Examples of audio transitions would include fading up and down during the transition (analogous to a fade switch) or a cut from the audio data corresponding to the first source sequence of images to audio data corresponding to the second source sequence of images (analogous to a cut switch).

A Wipe Switch in the Preferred Embodiment

A wipe switch appears as a directional sweeping over of a first image source with a second image source. In a wipe switch the first image source remains static on the display area while the second image source overlays the display area from a predetermined direction, over time. For example, in a left to right wipe, the first source image will be displayed. At a first instant in time of the transition, the left most portion of the second source image will overlay the left most portion of the first source image. As the transition continues, more of the second source image will overlay the first source image, from a left to right direction. This will continue, until the entire first image is overlaid and the transition is complete.

A transition resource data item that defines such a wipe from left to right switch is illustrated in Chart C.

CHART C

| Line No. | |
|---|---|
| 1 | resource 'TRNS' (WipeLeft,"WipeLeft",purgeable) { |
| 2 | 1, |
| 3 | secondOnTop, |
| 4 | 80, |
| 5 | 60, |
| 6 | { {0,0,60,80}, }, |
| 7 | { {0,0,60,80}, }, |
| 8 | { |
| 9 | RectTween { |
| 10 | 0, 0, 0, |
| 11 | {0,−81,60,−1}, |
| 12 | {0,0,60,80} |
| 13 | }; |
| 14 | }; |
| 15 | }; |

CHART C -continued

| Line No. | |
|---|---|
| 16 | }; |

It should be noted that a wipe may occur from any direction. For example to create a right to left wipe, the transition resource data item would simply change the positioning and/or state of the selection region.

For the transition to occur, a portion of the first sequence of images is chosen to merge with a portion of the second sequence of images to create a third sequence of images (the transition sequence). With respect to Chart C, line 2 indicates that the transition is not a dissolve and line 3 indicates that the second sequence of images is on top and thus the selection objects to be later defined will relate to the second source image area. Lines 4–5 define the base dimensions of the output image area. Line 6 defines a first source image area without a trajectory while line 7 defines a second source image area without a trajectory. Thus, in this instance there will be no interpolation of the source image areas. At line 9, a selection object is defined. Here the selection object is a RECTWEEN. The RECTWEEN selection object defines no dissolve values, so no object indices need be created through interpolation. The RECTWEEN selection object does defined a begin state (line 11) and an end state (line 12). Thus, interpolation of the selection object from its begin to end state occurs. As noted above, the duration of the transition will be a default of 2 seconds.

As there is no trajectory for the source image areas, the mapping of the respective source image areas is directly overlaying the source image area. Finally, wipe transition is created by merging the chosen portion of the first sequence of images, the chosen portion of the second sequence of images and a transition template generated in the selection, interpolation and mapping steps described above, to create the third sequence of images (i.e. the transition sequence).

An Iris Switch in the Preferred Embodiment

An Iris switch is an analogy to an opening of a lens iris, e.g. in the human eye or in a camera. It refers to the gradual opening of a visual aperture. Here, in the simplest form, the visual aperture is a circle where the first source sequence of images will be static (in the sense of translational movement) within the output image area. Over time, the aperture size, e.g. radius, will increase, displaying more of the second source sequence of images, until the transition is completed.

An Iris-out switch transition resource type data element is illustrated in Chart D1.

CHART D1

| Line No. | |
|---|---|
| 1 | resource 'TRNS' (IrisOut,"IrisOut",purgeable) { |
| 2 | 1, |
| 3 | secondOnTop, |
| 4 | 80, |
| 5 | 60, |
| 6 | { {0,0,60,80}, }, |
| 7 | { {0,0,60,80}, }, |
| 8 | { |
| 9 | { |
| 10 | IrisTween { |
| 11 | 0, 0, 0, |
| 12 | {30,40}, |
| 13 | 0, |

CHART D1 -continued

| Line No. | |
|---|---|
| 14 | {30,40}, |
| 15 | 50 |
| 16 | }; |
| 17 | }; |
| 18 | }; |
| 19 | }; |

An Iris-in is similar to an Iris-out except that the first sequence of images contracts to a predetermined point, exposing the second sequence of images. The begin state of a selection object, i.e., a circle with a sufficiently large radius, for the first source image area encompasses the entire source image area. The end state is a circle with a zero radius. The interpolation will cause the selection object of the first source image area to diminish to zero. Chart D2 illustrates an Iris-in transition resource data element.

CHART D2

| Line No. | |
|---|---|
| 1 | resource 'TRNS' (IrisIn,"IrisIn",purgeable) { |
| 2 | 1, |
| 3 | firstOnTop, |
| 4 | 80, |
| 5 | 60, |
| 6 | { {0,0,60,80}, }, |
| 7 | { {0,0,60,80}, }, |
| 8 | { |
| 9 | { |
| 10 | IrisTween { |
| 11 | 0, 0, 0, |
| 12 | {30,40}, |
| 13 | 50, |
| 14 | {30,40}, |
| 15 | 0 |
| 16 | }; |
| 17 | }; |
| 18 | }; |
| 19 | }; |

A Fade/Dissolve Switch in the Preferred Embodiment

An alternative use of the transition template would provide for fade. A fade transition occurs where the first source sequence of images gradually turns to (i.e. fades to) a predetermined color (e.g. black). Alternatively, the fade may be from the predetermined color to a second source sequence of images.

As described above, a fade switch merely utilizes a frame of a predetermined color as one of the source sequences of images. The transition template utilized is a series of frames going from white to black, with various shades of gray in between.

A dissolve switch would operate identically, except that the second source sequence of images would be an actual video sequence rather than a frame of a predetermined color.

A data element for the resource transition is described in Chart E.

CHART E

| Line No. | |
|---|---|
| 1 | resource 'TRNS' (Dissolve,"Dissolve",purgeable) { |
| 2 | 8, |
| 3 | secondOnTop, |
| 4 | 80, |
| 5 | 60, |

CHART E -continued

| Line No. | |
|---|---|
| 6 | { {0,0,60,80}, }, |
| 7 | { {0,0,60,80}, }, |
| 8 | { |
| 9 | { |
| 10 | RectTween { |
| 11 | 0, 1, 1, |
| 12 | {0,0,60,80}, |
| 13 | {0,0,60,80}, |
| 14 | }, |
| 15 | }, |
| 16 | }; |
| 17 | }; |

A Push Switch in the Preferred Embodiment

A push switch involves movement of the source image area in relation to the output image area. The effect is that the second source sequence of images pushes the first sequence of images out of the viewable display. What occurs is that the mapping of the source image area to the output image area changes over time. In the previously described switches, no such changes occur.

What occurs is that the mapping of the image area for the first sequence of images moves in a predetermined direction out of the output image area. The space vacated by the first sequence is consumed by the second source sequence of images. For example, if the first sequence of images is moving down, the bottom of the first sequence of images would move out of the bottom of the output image area, while the bottom of the second sequence of images would move into the top of the output image area. The same would would true for bottom to top, left to right or right to left push transitions.

A data element defining a push transition is described in Chart F.

CHART F

| Line No. | |
|---|---|
| 1 | resource 'TRNS' (PushDown,"PushDown",purgeable) { |
| 2 | 1, |
| 3 | secondOnTop, |
| 4 | 80, |
| 5 | 60, |
| 6 | { |
| 7 | {0, 0, 60, 80 }, |
| 8 | {60, 0, 120, 80 }, |
| 9 | }, |
| 10 | { |
| 11 | {−60, 0, 0, 80 }, |
| 12 | { 0, 0, 60, 80}, |
| 13 | }, |
| 14 | { |
| 15 | }; |
| 16 | }; |

A Multi-Object Switch in the Preferred Embodiment

Multi-Object regions can be defined to create custom transitions. For example, a barn door transition would require the definition of two objects, e.g. rectangles, each having a begin and an end state. Here, a left rectangle may have begin state (top left: 0, 0; bottom right: 1.0, 0) and end state (top left: 0, 0; bottom right: 1.0, 0.5); while the fight rectangle may have begin state (top left: 0, 1.0; bottom right: 1.0, 1.0) and end state (top left: 0, 0.5; bottom right 1.0, 1.0).

In this example, the "barn doors" would reveal the first source sequence of images, so that when closed, the second source sequence of images would be displayed. Each of the doors would essentially be a simultaneous wipe, that terminated in the middle of the output image area. Chart G1 illustrates a barn door data element.

CHART G1

```
1    resource 'TRNS' (BarnDoors,"BarnDoors",purgeable) {
2      1,
3      secondOnTop,
4      80,
5      60,
6      { {0,0,60,80}, },
7      { {0,0,60,80}, },
8      {
9        RectTween {
10         0, 0, 0,
11         {0,-81,60,-1},
12         {0,0,60,40}
13       };
14       RectTween {
15         0, 0, 0,
16         {60, 81, 60, 161},
17         {60, 41, 60, 121}
18       };
19     };
20   };
21 };
```

The preferred embodiment further allows for the interpolation of multiple selections sequentially in time as well as sequentially in space. One example of this would be a version of the barn door wipe just discussed—say the left "door" closed first, then the right "door" after (compared to both of them closing at once, concurrently in space). The left door closing takes place over the first half of the transition time, the right door closing takes place over the second half of the transition time. This effect is created by defining a first rectangle with a start state at the extreme left and an end state in the middle of the output image rectangle followed by a rectangle with a start state at the extreme right with an end state in the middle of the output image rectangle. Such a data element is illustrated in Chart G2.

CHART G2

```
1    resource 'TRNS' (BDLR,"BDLR",purgeable) {
2      1,
3      secondOnTop,
4      80,
5      60,
6      { {0,0,60,80}, },
7      { {0,0,60,80}, },
8      { {
9        RectTween {
10         0, 0, 0,
11         {0,-81,60,-1},
12         {0,0,60,40}
13       }},
14     {
15       RectTween {
16         0, 0, 0,
17         {60, 81, 60, 161},
18         {60, 41, 60, 121}
19       }};
20     };
21     };
21 };
```

Titling in the Preferred Embodiment

Titling may be accomplished by using any type of transition. One common form of titling is to see a sequence of images, e.g. credits in a move, scrolling through the another sequence of images. This type of titling is accomplished in the preferred embodiment by using a wipe transition resource which wipes the second source of images completely across the first source of images within the output image area. This differs from the wipe described above in that the second source sequence of images would roll completely through the output image frame, rather than stop when it overlays the first source sequence of images. The second source sequence of images would have the desired titling. As is common in titling, e.g. when the credits are shown at the end of a movie, the first source images are displayed "underneath" the titling. This may be accomplished by selecting all colors except the coloring of the lettering in the title frames. As described above, colors that are selected become transparent when combined with the first source sequence of images and the transition template to create the transition. Such titling transition data element is illustrated in Chart H. In Chart H the titling would roll from the top of the display area down through the bottom.

CHART H

```
1    resource 'TRNS' (Titling,"Titling",purgeable) {
2      1,
3      secondOnTop,
4      80,
5      60,
6      { {0,0,60,80}, },
7      { {0,0,60,80}, },
8      {
9        RectTween {
10         0, 0, 0,
11         {61, 80, 121, 80}
12         {-61, 80, -1, 80}
13       };
14
15     };
16   };
17 }
```

A second effect that may be useful for titling is to keep certain portions of the title on the screen for a longer period of time, e.g. the title of a move. This can be accomplished simply by determining the location in the transition template where the title would be centered, and extending the duration of that frame. The steps to accomplish this were described above with reference to the dicon information window.

Combining Transitions

Besides multiple objects, multiple transitions can be coupled together to create a single, transition. For example, a fade to black from a first sequence of images (creating a first half of the target transition) can be combined with a fade from black to a second source sequence of images (creating a second half of the target transition) so that a smooth transition from the two source sequence of images is enabled. An example of this would be when a single sequence of images needs to be broken-up into two sequences of images. This type of transition may be particularly useful when a sequence of images is interrupted due to a exhaustion of storage media (e.g. end of tape) or when there will be a known pause or break in the sequence of images.

This will involve the following steps:

1. Use light to dark fade transition resource to create an intermediate sequence of images and a first source sequence of images and a single frame darkened frame as a second source.

2. Use light to dark fade transition resource to create a target sequence of images using single darkened frame as first source and intermediate sequence of images as the second source.

Thus, a method and apparatus for defining and creating transitions between sequences of images is described. Utilizing a transition resource means which selects, maps and interpolates a transition resource data element to create a transition template, user definable transitions are achieved. Further, through the use of an interface that is familiar to users of computer systems, the learning curve to utilize the functionality of the present invention is minimized.

We claim:

1. In a computer controlled display system, a method for transitioning from a first sequence of digitized images to a second sequence of digitized images, said method comprising the steps of:
   a. providing said first sequence of digitized images and said second sequence of digitized images to said computer system;
   b. storing said first sequence and said second sequence of digitized images in said computer system;
   c. providing a first duration time for a transition between said first sequence of images and said second sequence of images;
   d. determining a first portion of said first sequence of digitized images and a second portion of said second sequence of digitized images;
   e. determining an output image area;
   f. determining a first source image area corresponding to said first sequence of digitized images and determining a second source image area corresponding to said second sequence of digitized images;
   g. determining which of said first source image area or said second source image area is on top, when said first source image area and said second source image area are overlapped;
   h. determining at least one selection object, said at least one selection object defining a first begin state and a second end state, said at least one selection object defining a selected region of one of said first source image area or second source image area;
   i. interpolating, said interpolating step for determining a plurality of intermediate states for said at least one selection object;
   j. mapping said states of said at least one selection object to one of said first or said second source image areas creating a transition template; and
   k. merging said first portion of said first sequence of images, said second portion of said second sequence of images and said transition template to thereby produce a third sequence of images.

2. The method as recited in claim 1 wherein said step of interpolating is further comprised of the steps of:
   determining a first trajectory state and a second trajectory state of said first source image area;
   determining a first trajectory state and a second trajectory state of said second source image area;
   for said first source image area, if said first trajectory state does not equal said second trajectory state, then interpolating said first source image area to create one or more intermediate states; and
   for said second source image area, if said first trajectory state does not equal said second trajectory state, then interpolating said second source image area to create one or more intermediate states.

3. The method as recited in claim 2 wherein said method further comprises the steps of:
   identifying a transition image frame of said transition template;
   providing a duration for said transition image frame; and
   repeating step k.

4. The method as recited in claim 2 wherein said step of interpolating over time and space said selection object is further comprised of the steps of:
   determining a time duration for each intermediate state of said selection object;
   determining a first geometric shape of said selection object; and
   calculating a second geometric shape based on said time duration.

5. The method as recited in claim 1 wherein prior to step d a transition resource means is provided, said transition resource means comprised of a transition resource type and a transition resource data element, said transition resource type is comprised of:
   an output image area definition means for defining a spatial area for an output image;
   source image area definition means for defining a spatial area corresponding to a sequence of image; and
   selection object definition means for defining one or more objects associated with said second sequence of images.

6. The method as recited in claim 5 wherein said transition template is created by the user.

7. The method as recited in claim 6 wherein said method is comprised of the further step of providing said third sequence of images as a second transition sequence of images.

8. The method as recited in claim I wherein said at least one selection object further defines a dissolve attribute, said dissolve attribute comprising a begin numerator value, an end numerator value and a denominator value.

9. The method as recited in claim 8 wherein said interpolation step is further comprised of determining an object index value for each intermediate state for each said at least one selection object.

10. The method as recited in claim 1 is further comprised of the steps of:
    Providing a second duration for said transition; and
    Repeating Steps h-k.

11. The method as recited in claim 1 is further comprised of the steps of:
    providing one or more pixel values for creating a pixel list;
    repeating step k, wherein step k is further comprised of the steps of:
    determining when a pixel value from said second source sequence of digital images equals a value on said pixel list; and
    utilizing the pixel value from said first source sequence of images producing the third sequence of images.

12. The method as recited in claim 1 wherein prior to step k, a transition template is created, said transition template created by combining said selected regions of said one of said first and said second source image areas and said output image area, said transition template comprised of a plurality of transition image frames.

13. In a computer controlled display system, a method for creating a transition sequence of images, said sequence of images representing a transition from a first source sequence of images to a second source sequence of images, said method comprising the steps of:
  a. displaying a source image window, said source image window containing at least one dicon representing a source sequence of images;
  b. displaying a transition template window, said transition template window containing at least one dicon representing a transition template;
  c. selecting a first dicon representing said first source sequence of images from said source image window;
  d. selecting a second dicon representing said second source sequence of images from said source image window;
  e. selecting a third dicon representing a transition template from said transition template window, said transition template comprised of a representation of a third sequence of images and a first duration for said transition; and
  f. displaying said transition sequence of images in a fourth predetermined area of said transition window.

14. The method as recited in claim 13 wherein said step of selecting a third dicon representing a transition template is further comprised of the steps of:
  positioning a cursor on a predetermined menu area and placing a switch associated with a cursor control device in a second position;
  displaying a menu of alternative commands;
  positioning said cursor on a predetermined area representing a predetermined command and placing said switch associated with said cursor control device in a first position;
  displaying a dicon information window, said dicon information window including a first predetermined area for displaying a plurality of transition template frames and a second predetermined area for displaying and changing the duration of a transition template frame;
  selecting an associated one of said transition template frames, said associated one of said images having a first duration; and
  providing a second duration for said selected associated one of said transition template frames, said second duration different from said first duration.

15. The method as recited in claim 13 wherein said step of selecting a third dicon representing a transition template is further comprised of the steps of:
  positioning a cursor on a predetermined menu area and placing a switch associated with a cursor control device in a second position;
  displaying a menu of alternative commands;
  positioning said cursor on a predetermined area representing a predetermined command and placing said switch associated with said cursor control device in a first position;
  displaying a dicon information window, said dicon information window including a first predetermined area for displaying a first duration of said transition template; and
  providing a second duration for said transition template.

16. The method as recited in claim 13 wherein said step of selecting said first dicon representing a first source sequence of images is comprised of the steps of:
  positioning a cursor on said first dicon by movement of a cursor control device;
  placing a switch associated with said cursor control device into a second position;
  positioning said cursor to a first predetermined area within said transition window; and
  placing a switch associated with said cursor control device into a first position.

17. The method as recited in claim 16 wherein said step of selecting said second dicon representing a second source sequence of images is comprised of the steps of:
  positioning said cursor on said second dicon by movement of said cursor control device;
  placing said switch associated with said cursor control device into said second position;
  positioning said cursor onto a second predetermined area within said transition window; and
  placing said switch associated with said cursor control device into said first position.

18. The method as recited in claim 17 wherein said step of selecting a third dicon representing a transition template is further comprised of the steps of:
  positioning said cursor on said third dicon by movement of said cursor control device;
  placing said switch associated with said cursor control device into said second position;
  positioning said cursor a third predetermined area within said transition window; and
  placing said switch associated with said cursor control device into said second position.

19. A computer controlled display system for creating a transition from a first sequence of images to a second sequence of images, said system comprising:
  a first storage means for storing said first sequence of images;
  a second storage means for storing said second sequence of images;
  a third storage means for storing a transition template, said transition template comprised of one of more frames;
  transition resource means for creating said transition template;
  processing means for combining said first sequence of images, said second sequence of images and said transition template to create a transition sequence;
  means for changing a time duration of said transition, said means for changing being coupled to said transition resource means; and
  displaying means for displaying said first sequence of images; said second sequence of images, and said transition sequence of images.

20. The system as recited in claim 19 wherein said transition resource means is further comprised of:
  determining an output image area;
  selections means for selecting a region of a source image area, said source image area associated with one of said first sequence of images or said second sequence of images;
  interpolation means coupled to said selection means, said interpolation means for creating intermediate states of said selected region of said source image area; and
  mapping means coupled to said interpolation means, said mapping means for positioning said source image area in relation to said output image area.

21. The system as recited in claim 20 further comprised of means for providing a second duration for a frame of said transition template.

* * * * *